US012345025B2

(12) United States Patent
Stuckenberg et al.

(10) Patent No.: US 12,345,025 B2
(45) Date of Patent: Jul. 1, 2025

(54) ATMOSPHERIC WATER GENERATION SYSTEMS AND METHODS

(71) Applicant: Genesis Systems LLC, Kansas City, MO (US)

(72) Inventors: David James Stuckenberg, Tampa, FL (US); Erick Keith Went, Camarillo, CA (US); Owen Michael Erickson, Largo, FL (US); Venkateswara Rao Kode, Tampa, FL (US)

(73) Assignee: Genesis Systems LLC, Tampa, FL (US)

( * ) Notice: Subject to any disclaimer, the term of this patent is extended or adjusted under 35 U.S.C. 154(b) by 391 days.

(21) Appl. No.: 17/810,930

(22) Filed: Jul. 6, 2022

(65) Prior Publication Data

US 2023/0010376 A1    Jan. 12, 2023

Related U.S. Application Data

(60) Provisional application No. 63/203,064, filed on Jul. 7, 2021.

(51) Int. Cl.
*B01D 5/00* (2006.01)
*B01D 53/26* (2006.01)
*E03B 3/28* (2006.01)

(52) U.S. Cl.
CPC .............. *E03B 3/28* (2013.01); *B01D 5/0003* (2013.01); *B01D 5/006* (2013.01); *B01D 53/263* (2013.01)

(58) Field of Classification Search
CPC .............. B01D 5/00; B01D 53/26; E03B 3/28
See application file for complete search history.

(56) References Cited

U.S. PATENT DOCUMENTS 8,519,012 B2    8/2013    O'Connor
8,754,269 B2    6/2014    O'Connor
(Continued)

FOREIGN PATENT DOCUMENTS

JP    2019-520980 A    7/2019
JP    2021-028050 A    2/2021
(Continued)

OTHER PUBLICATIONS

International Searching Authority, International Search Report and Written Opinion received for International Application No. PCT/US2022/036208, dated Oct. 25, 2022, 15 pages, European Patent Office, NL.

(Continued)

*Primary Examiner* — Sharon Pregler
(74) *Attorney, Agent, or Firm* — Alston & Bird LLP

(57) ABSTRACT

An atmospheric water generation system comprises water vapor consolidation systems configured to increase the relative humidity of a controlled air stream prior to condensing water from the controlled air stream. The water vapor consolidation system comprises a fluid-desiccant flow system configured to decrease the temperature of the desiccant to encourage water vapor to be absorbed by the desiccant from an atmospheric air flow. The desiccant flow is then heated to encourage water vapor evaporation from the desiccant flow into a controlled air stream that circulates within the system. The humidity of the controlled air stream is thereby increased above the relative humidity of the atmospheric air to facilitate condensation of the water vapor into usable liquid water.

9 Claims, 18 Drawing Sheets

(56) References Cited

U.S. PATENT DOCUMENTS

| | | | |
|---|---|---|---|
| 9,101,093 B2 | 8/2015 | Chance et al. | |
| 9,206,990 B2 * | 12/2015 | Wamstad | B01D 53/261 |
| 9,550,142 B2 | 1/2017 | Roestenberg et al. | |
| 9,751,039 B2 | 9/2017 | Gebald et al. | |
| 9,969,665 B2 | 5/2018 | O'Connor et al. | |
| 10,232,305 B2 | 3/2019 | Gebald et al. | |
| 10,279,306 B2 | 5/2019 | Gebald et al. | |
| 10,350,547 B2 | 7/2019 | Bijl et al. | |
| 10,427,086 B2 | 10/2019 | Gebald et al. | |
| 10,807,042 B2 | 10/2020 | Bijl et al. | |
| 10,882,743 B2 | 1/2021 | O'Connor | |
| 11,007,470 B2 | 5/2021 | Wurzbacher et al. | |
| 11,285,425 B2 | 3/2022 | Sauerbeck et al. | |
| 11,420,149 B2 | 8/2022 | Gebald et al. | |
| 11,441,393 B2 | 9/2022 | Meehan et al. | |
| 11,572,765 B2 | 2/2023 | Meehan et al. | |
| 11,612,879 B2 | 3/2023 | Gebald et al. | |
| 11,712,652 B2 | 8/2023 | Spiteri et al. | |
| 2008/0202333 A1 | 8/2008 | Matsuura et al. | |
| 2011/0041537 A1 | 2/2011 | Pun | |
| 2018/0126325 A1 | 5/2018 | Sher | |
| 2018/0169571 A1 | 6/2018 | Stuckenberg | |
| 2019/0060820 A1 | 2/2019 | O'Connor | |
| 2019/0118143 A1 | 4/2019 | Mitra et al. | |
| 2019/0331353 A1 | 10/2019 | Edström et al. | |
| 2020/0206679 A1 | 7/2020 | Stuckenberg | |
| 2021/0053010 A1 | 2/2021 | Sakuma et al. | |
| 2021/0162338 A1 | 6/2021 | Zaworotko et al. | |
| 2021/0205783 A1 | 7/2021 | O'Connor | |
| 2022/0176310 A1 | 6/2022 | Suter et al. | |
| 2022/0193598 A1 | 6/2022 | Suter et al. | |
| 2022/0195706 A1 | 6/2022 | Stuckenberg et al. | |
| 2022/0288505 A1 | 9/2022 | Stuckenberg et al. | |
| 2023/0160283 A1 | 5/2023 | Meehan et al. | |
| 2023/0173427 A1 | 6/2023 | Repond et al. | |
| 2023/0201759 A1 | 6/2023 | Spiteri et al. | |
| 2023/0211276 A1 | 7/2023 | Spiteri et al. | |
| 2023/0233985 A1 | 7/2023 | Vargas et al. | |

FOREIGN PATENT DOCUMENTS

| | | |
|---|---|---|
| WO | 2017/221133 A1 | 12/2017 |
| WO | WO 2018/002918 A1 | 1/2018 |
| WO | 2019/116986 A1 | 6/2019 |
| WO | 2019/138794 A1 | 7/2019 |
| WO | 2019/168028 A1 | 9/2019 |

OTHER PUBLICATIONS

English translation of JP Search report dated Nov. 22, 2024 for JP Application No. 2024500267, 41 page(s).
JP Search report Mailed on Nov. 22, 2024 for JP Application No. 2024500267, 31 page(s).

* cited by examiner

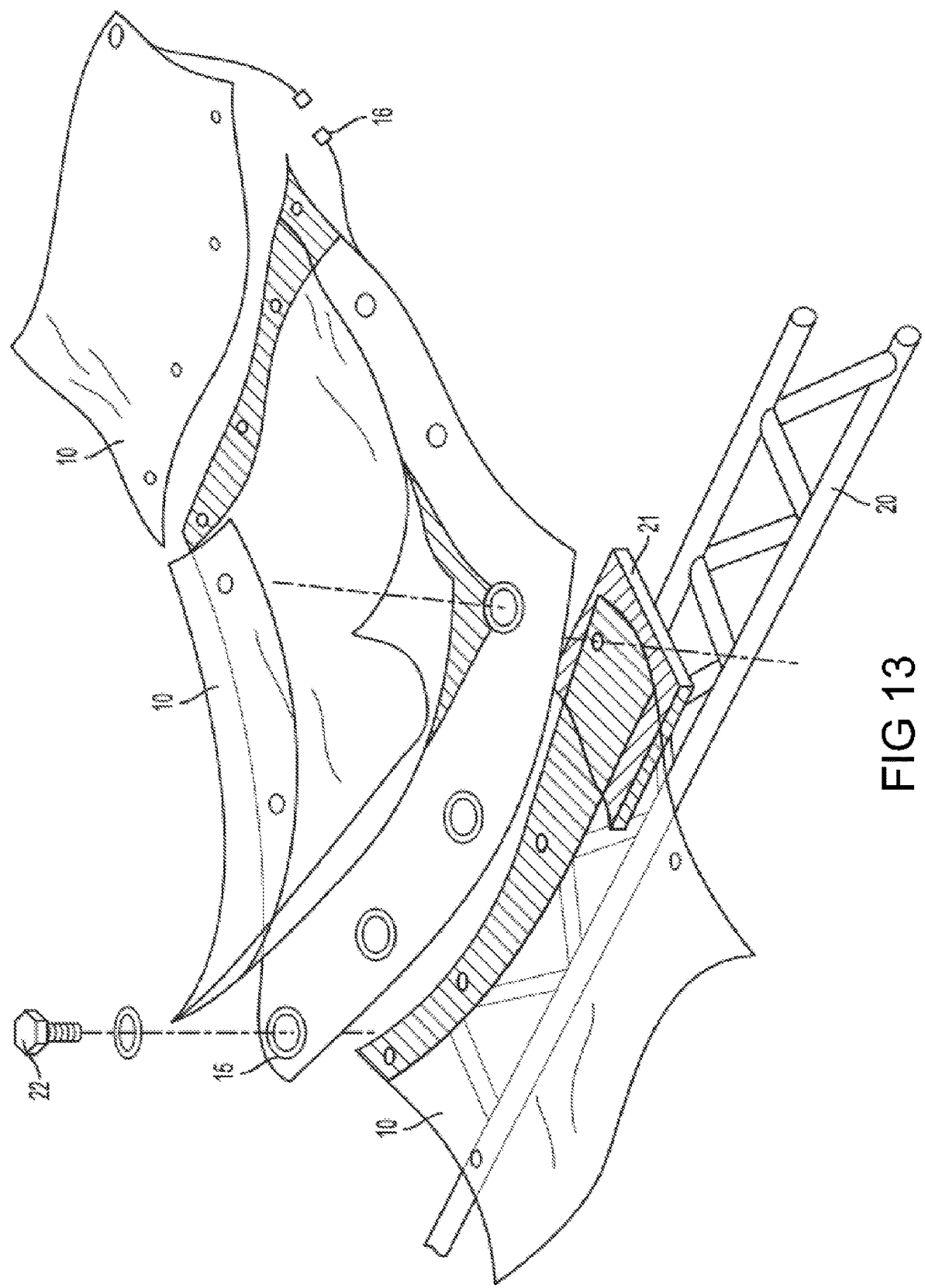

ATMOSPHERIC WATER GENERATION SYSTEMS AND METHODS

CROSS-REFERENCE TO RELATED APPLICATIONS

This patent application claims priority to U.S. Provisional Patent Application Ser. No. 63/203,064, filed Jul. 7, 2021, which is incorporated herein by reference in its entirety.

This patent application additionally relates to U.S. patent application Ser. No. 17/552,173, filed Dec. 15, 2021, which claims priority from Provisional Appl. Ser. No. 63/126,860, filed Dec. 17, 2020. This patent application additionally relates to U.S. patent application Ser. No. 16/782,808, filed Feb. 5, 2020, which is a continuation of U.S. patent application Ser. No. 15/850,870, filed Dec. 21, 2017, which claims priority from Provisional Application Ser. No. 62/437,471, filed Dec. 21, 2016; Provisional Application Ser. No. 62/459,462, filed Feb. 15, 2017; and Provisional Application Ser. No. 62/459,478, filed Feb. 15, 2017, all of which are incorporated herein by reference in their entirety.

BACKGROUND

The amount of freshwater available for human consumption, plant irrigation, livestock and herd sustenance, commercial and/or industrial usage, and other purposes has generally been overtaken by the amount of freshwater needed for such purposes. Particularly in arid climates characterized by minimal annual rainfall and without access to other freshwater sources, maintaining an adequate amount of water for human and/or animal consumption and usage has become increasingly expensive in recent years. Processes such as desalination, water filtration and/or purification, groundwater (e.g., aquifer) exploitation, and other processes are often used in combination to supply freshwater to various geographical regions, depending on the relative availability and expense of each water sourcing process.

Water shortages in certain geographical regions are also at least partially responsible for food shortages in certain areas of the globe as well. Where water is not readily available for crop irrigation and for hydrating livestock, basic nutritional foods may be difficult to cultivate, and may be difficult or expensive to procure in an open market.

Accordingly, a need generally exists for processes that expand the availability of freshwater, particularly in arid geographical areas and/or areas with no access to standing water or sub-surface water or in areas where such have become contaminated.

BRIEF SUMMARY

Various embodiments are directed to an atmospheric water generation system comprising: an absorber configured to intersect an atmospheric air stream with a desiccant flowing along a closed desiccant circulation loop to extract water vapor from the atmospheric air stream and to absorb the extracted water vapor into the desiccant; at least one water extraction device configured to extract water from the desiccant in the liquid desiccant for collection within a permeate water flow path, wherein the water extraction device comprises: at least one excitation component and at least one water separation component. The excitation component comprising at least one heating system to raise the temperature of the liquid desiccant prior to entering at least one water separation component. In certain embodiments, the excitation component comprises an apparatus that utilizes at least one excitation system selected from the group consisting of ultrasonic waves, microwaves, or a combination thereof.

Certain embodiments are directed to a method of extracting water from atmospheric air, the method comprising: intersecting an atmospheric air stream with a desiccant in an absorber to extract water vapor from the atmospheric air stream and to absorb the extracted water vapor into the desiccant. In embodiments described herein, the desiccant flows along a closed desiccant circulation loop to a water excitation component heating the hygroscopic feed and subsequently to a water separation component wherein the heated liquid desiccant is separated into captured water vapor and concentrated liquid desiccant which is circulated back to the atmospheric water absorption component.

Certain embodiments described herein are directed to a water extraction device comprising an ultrasonic excitation component positioned between an atmospheric water collection component and a water separation component, wherein the excitation component comprises a housing having an inlet configured to receive a liquid desiccant from the atmospheric water collection component and an outlet for the liquid desiccant to flow to the water separation system, wherein the liquid desiccant comprises a hygroscopic feed solution; and one or more ultrasonic nozzles positioned within the housing and configured to apply ultrasonic waves to liquid desiccant within the housing to excite water molecules within the liquid desiccant.

Certain embodiments described herein are directed to a water extraction device comprising a microwave excitation component positioned between an atmospheric water collection component and a water separation component, wherein the excitation component comprises a housing having an inlet configured to receive a liquid desiccant from the atmospheric water collection component and an outlet for the liquid desiccant to flow to the water separation system, wherein the liquid desiccant comprises a hygroscopic feed solution; and one or more microwave generators and waveguides positioned within the housing and configured to apply microwaves to liquid desiccant within the housing to excite water molecules within the liquid desiccant.

Embodiments described herein are further directed to methods of water extraction comprising separating water from the liquid desiccant using an ultrasonic water extraction device, wherein the liquid desiccant flows into the excitation component from the atmospheric water collection component; the liquid desiccant in the excitation component is excited using ultrasonic waves in order to heat the solution and generate high humidity water vapor; and subsequently, the heated liquid desiccant flows out of the excitation component and into the water separation system where the water is separated from the desiccant.

Embodiments described herein are further directed to methods of water extraction comprising separating water from the liquid desiccant using a microwave water extraction device, wherein the liquid desiccant flows into the excitation component from the atmospheric water collection component; the liquid desiccant in the excitation component is excited using microwaves in order to heat the solution and generate high humidity water vapor; and subsequently, the heated liquid desiccant flows out of the excitation component and into the water separation system where the water is separated from the desiccant.

BRIEF DESCRIPTION OF THE DRAWINGS

Reference will now be made to the accompanying drawings, which are not necessarily drawn to scale, and wherein:

FIG. 13 shows an example view of a surface covering panel secured relative to a support frame.

DETAILED DESCRIPTION

Figure 1:
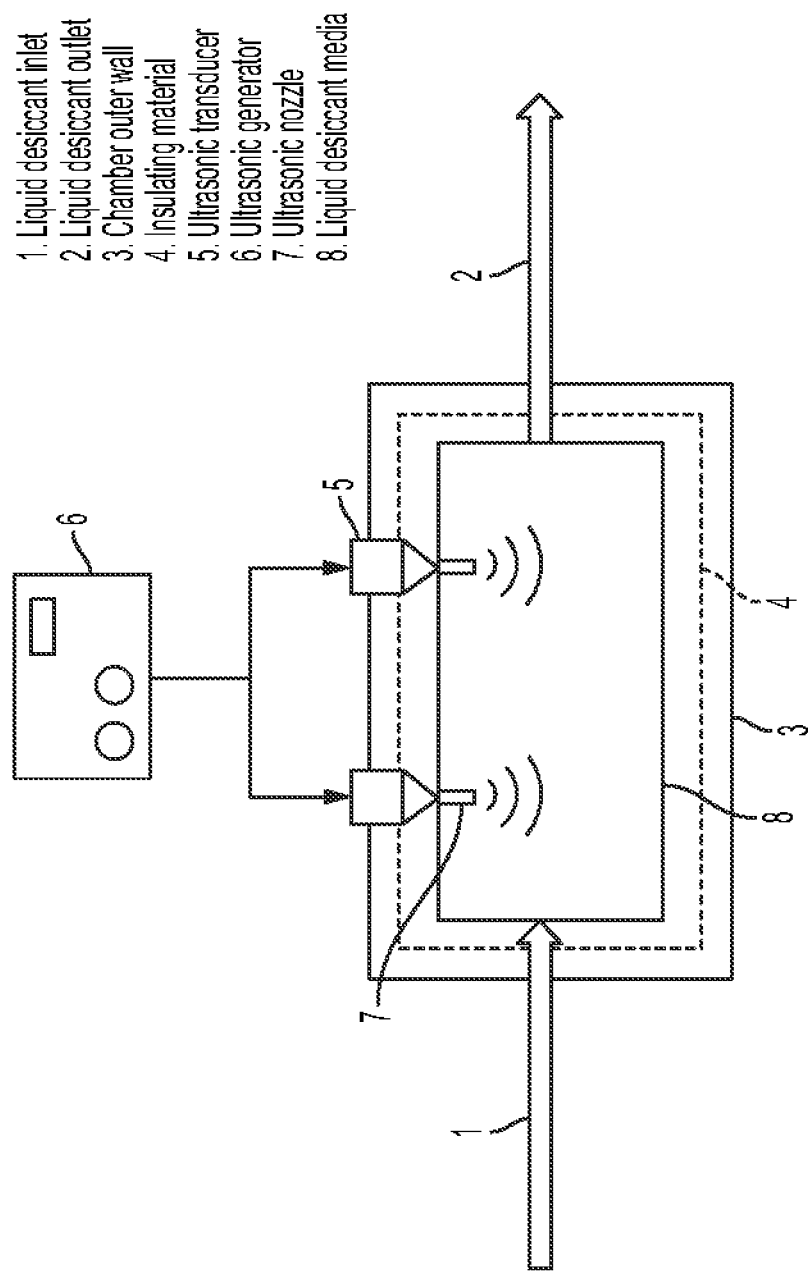
FIG. 1 shows a schematic diagram of an ultrasonic water excitation system according to one embodiment.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

The performance of atmospheric water generation (AWG) systems is primarily dependent on the local atmospheric conditions and hygroscopic desiccant media. Particularly, hygroscopic desiccant media in the absorber column is used to first capture water vapor from the ambient air. Subsequently, absorbed water is extracted from a dilute desiccant solution with an external energy input during regeneration which is classified as a highly energy demanding unit operation of AWG. While conventional heat-only methods are mostly implemented for water separation during regeneration, they have always been associated with an increased cost of produced water by AWG systems. Thus, alternative innovative technologies that can regenerate liquid desiccant in an energy-efficient manner with improved AWG system efficiency are sought.

The atmospheric water generation (AWG) system utilizes an absorption system for extracting water from atmospheric air. Even for low-humidity atmospheric air (air having a humidity of greater than zero), certain amounts of water can be extracted from the air, at least in part by contacting the atmospheric air with a rich desiccant solution under controlled conditions conducive to mass transfer of water from the atmospheric air (where it exists in vapor form) into a dilutant of the desiccant solution (where it exists in liquid form). The controlled conditions may define particular temperature and/or pressure conditions, so as to raise the vapor pressure existing within the controlled environment. Aspects of controlling the environment to encourage condensation of water vapor from atmospheric air into a desiccant solution include controlling the temperature (e.g., lower the temperature of atmospheric air as it contacts the desiccant solution), controlling the pressure (e.g., increasing the pressure of the air as it contacts the desiccant solution), controlling the surface area of desiccant solution as it contacts the atmospheric air (e.g., flowing the desiccant solution across various high-surface area plates to increase the surface area of the desiccant solution), and/or controlling the flowrate and/or flow path of the atmospheric air and/or the desiccant solution (e.g., providing a turbulent flow of the atmospheric air as it contacts the desiccant solution). Certain embodiments incorporate air compression mechanisms, air cooling mechanisms, or air humidity increasing mechanisms to optimize the amount of water extracted from air (per unit of source air intake into the AWG system).

In one embodiment, the AWG system utilizes a condensation coil and/or plate system for extracting water from air. During the water extraction process of the integrated AWG process, humid air (having greater than 0% humidity) is passed over/around/through cooled condensation surfaces (e.g., coils, plates, and/or the like) to lower the temperature of the humid air below the dew point, thereby causing water vapor within the humid air to condense on the condensation surfaces. The condensed water is then directed into a collection chamber (e.g., tank, basin, and/or the like) for storage and use.

As another example of an embodiment, the AWG system may utilize a liquid desiccant, such as a hygroscopic feed solution, to absorb water from air. The hygroscopic feed solution may pass through an excitation system, where it is bombarded with excitation signals, such as ultrasonic waves (FIG. 1) or microwaves (FIG. 2) to excite the liquid desiccant to cause the water within the liquid desiccant to be released as water vapor that can be cooled and collected as liquid water. The excitation system may be utilized alone for extraction of water from a liquid desiccant, or the excitation system may be utilized together with one or more additional water extraction systems, such as a membrane-based water separator system, and/or the like.

In certain embodiments, the AWG system additionally comprises one or more air compression mechanisms, air cooling mechanisms, or air humidity increasing mechanisms to optimize the amount of water extracted from air (per unit of source air intake into the AWG system).

In certain embodiments, the AWG system may be integrated with one or more carbon dioxide filtration/capture modules, one or more greenhouse modules, one or more power generation modules, and/or the like. For example, the source air intake into the AWG system may be routed through a carbon dioxide capture system prior to exhausting the dry, dehumidified air to the surrounding environment. The captured carbon dioxide may be stored for later processing in a tank, or it may be released (e.g., in a monitored quantity) into one or more greenhouse modules to increase the carbon dioxide concentration within the greenhouse to thereby increase crop growth efficiency.

Moreover, a power generation module, which may comprise one or more renewable energy power generation systems, such as solar/photovoltaic, geothermal, and/or the like, or hydrocarbon-fuel based power generation systems, may be integrated with the AWG system to provide needed electrical and/or thermal energy inputs for the AWG processes. In the event that such power generation modules generate carbon dioxide or other exhaust gases, the exhaust gases of the power generation modules may be routed through the carbon dioxide capture modules to decrease the carbon dioxide production of the integrated system.

Definitions

As used herein, the term "liquid desiccant" refers to a hygroscopic feed solution comprising a hygroscopic material and water. The liquid desiccant absorbs and retains water from the atmosphere. In embodiments described herein, the hygroscopic material can be selected from the group consisting of $CaCl_2$, NaCl, LiCl, $MgCl_2$, KCOOH, $CH_3COOK$, colloids, nanomaterials, and ionic liquids, or any combination thereof.

As used herein, the term "separation systems" refers to various processes that can be used to extract the water from the heated liquid desiccant. In certain embodiments described herein, the liquid desiccant is separated via one or more of electrodialysis, mechanical vapor compression, or distillation, including but not limited to, membrane distillation, vacuum membrane distillation, single effect distillation, or any combination thereof. Electrodialysis refers to the electrochemical separation process that uses DC power to move ions through selective ion exchange membranes in order to remove salt from the feed solution. Mechanical vapor compression refers to the process of increasing the pressure and temperature of the liquid desiccant before condensing it. Distillation refers to the process of heating the liquid desiccant to form vapors followed by condensing the vapors in order to isolate the liquid distillate (i.e., water). Membrane distillation applies a microporous hydrophobic membrane to separate vapor from the aqueous feed solution and condense it on the other side of the membrane. Single-effect distillation refers to the process of heating the liquid desiccant in an evaporator tank and the vapor is cooled in the condenser tank and stored as fresh water.

As used herein, the term "sensible heating" refers to palpable heat; any amount of heat that can be measured on a thermometer.

Atmospheric Water Resources

The atmosphere contains approximately 3100 cubic miles ($mi^3$) or 12,900 cubic kilometers ($km^3$) of water. This quantity is roughly equivalent to all of the water held by the Great Lakes by volume. Water vapor as a natural resource is constantly replenished by the natural closed loop hydrologic cycle, thereby providing a nearly limitless supply of water that may be extracted from air without adverse environmental impact.

Atmospheric Water Generation

The process of AWG comprises systems and methods for extracting water vapor from atmospheric source air by condensing the water vapor and capturing the condensed, liquid water. Certain embodiments may be combined with carbon dioxide capture systems as discussed herein. Certain embodiments comprise steps for preconditioning and/or compressing raw source air (e.g., air at atmospheric conditions) to ease the water extraction process, and/or condensing the water vapor trapped within the raw source air (e.g., by increasing the humidity of at least a portion of the raw source air) to maximize the amount of water vapor that may be extracted from a given unit volume of source air. As discussed herein, processed source air is compressed, consolidated, and/or otherwise manipulated through one or more processes, for example, to ease the water extraction process.

Air Preconditioning

As noted above, raw source air may be preconditioned to ease the water extraction process utilized to ultimately condense water vapor into usable liquid water. In certain embodiments, the preconditioning process may comprise steps for compressing the air to increase the vapor pressure of the air (thereby biasing a greater volume of water to the liquid state rather than the vapor state) and/or to decrease the temperature of the source air to a temperature nearer to the dew point. In certain embodiments, an air preconditioning system described herein may be utilized before and/or after a humidity increasing system, such as a desiccant-based humidity increasing system as described herein. Moreover, the air preconditioning system may be utilized before and/or after a carbon dioxide capture system as discussed herein.

As just one example, the air preconditioning process may comprise a series of compressors/pumps, venturi valves, vortex valves, manifolds, and/or the like collectively configured to decrease the temperature of the source air closer to the air dew point and/or to increase the pressure of the air prior to removing water vapor from the air (e.g., through condensation or absorption by a desiccant). For example, raw source air may be drawn into the air preconditioning system via a vacuum pressure formed at an inlet via a compressor 101 (e.g., a turbine/blower compressor having a plurality of stator or variable pitch turbine blades controllable via servo motors) and/or a centrifugal fan configured to increase the raw air pressure entering the air preconditioning system. In certain embodiments, the compressor and/or centrifugal fan may be rotated via one or more electrical motors (which may receive electrical input power from one or more power systems in communication with the air preconditioning system) mechanically connected with the compressor and/or centrifugal fan via a gear transmission, a belt drive, a chain drive, and/or the like.

In embodiments comprising a centrifugal fan, particulates, dust, and other heavy air contaminants are spun to the outermost edge of the centrifugal fan and are removed from the air stream and ejected from the air preconditioning system.

In certain embodiments, the filtered air may be directed into a carbon dioxide capture column, where it is passed over a fixed absorption bed configured to absorb carbon dioxide from the air, as discussed in greater detail herein. The carbon dioxide may be separated and directed away from the air stream via a compressor.

In certain embodiments, the filtered air (with a reduced carbon dioxide content) may be directed further through the air preconditioning system into a primary manifold, where the air is divided at a selected ratio by a variable plenum/valve. From the primary manifold, a first air stream continues along a bulk air stream, and a second air stream is directed to a vortex tube manifold as discussed herein.

The bulk air stream may proceed through one or more venturi valves each configured to decrease the pressure and temperature of the bulk air stream (the volume and quantity of air remains constant across each venturi valve while the pressure decreases, thereby causing the temperature of the air stream to decrease proportionally to the temperature) and/or through a precooler (e.g., a heat exchanger with a cooling fluid passing therethrough). After proceeding through the one or more venturi valves and/or the precooler, the bulk air stream may proceed to a temperature measurement portion, where the temperatures (e.g., dry bulb and wet bulb temperatures) of the bulk air stream are measured by one or more temperature measurement devices (e.g., thermometers) to determine the dew point of the bulk air stream. Outputs from the temperature measurement devices may be utilized by a controller to mix the bulk air stream with at least a portion of the vortex-chilled air stream to lower the temperature of the bulk air closer to the air dew point. For example, the controller may be in electronic communication with an electromechanical mixing valve that may be selectively opened or closed to vary the amount of vortex-chilled air that is introduced into the bulk air stream. Based on the determined dry-bulb and/or wet-bulb temperatures (as monitored by the controller), the controller may transmit a signal to a motor to move the electromechanical valve to a desired position to obtain a desired mixture of vortex-chilled air with the bulk air stream.

The vortex-chilled air begins as the second stream of air exiting the primary manifold. The second stream of air exits the primary manifold, and proceeds to a vortex tube manifold where it is pressurized (e.g., via a compressor) to a sufficient pressure to achieve a drop in temperature of the air travelling through one or more vortex tubes 106 of between approximately 70-150 degrees Fahrenheit. For example, the air may be pressurized to at least approximately 70-120 PSI prior to being directed into the one or more vortex tubes. Each vortex tube comprises an entry port directing the stream of air tangentially into an internal spin chamber. As air enters the spin chamber, the air takes on an angular momentum, causing dense, warm air to migrate towards an exterior perimeter of the spin chamber and out of an exhaust valve. In certain embodiments, the warm air may be utilized to heat a carbon dioxide capture column. The remaining, vortex-chilled air migrates toward the center of the spin chamber and out of a vortex outlet. As mentioned above, the vortex-chilled air may be mixed with the bulk air stream to lower the temperature of the bulk air stream closer to the dew point. As yet another alternative, the vortex chilled air may be utilized to chill the precooler through which the bulk air passes.

In certain embodiments, the mixed and chilled bulk air stream is then directed into a condensation chamber, where the water vapor within the air is condensed into liquid water. As just one example, the bulk air stream may be directed over a series of condensation surfaces (e.g., chilled plates, screens, tubes, and/or the like configured to lower the localized temperature of the air at the condensation surfaces below the air dew point, thereby causing the water vapor to condense on the condensation surfaces. The condensed water may then be routed from the condensation surfaces into a retention chamber for collection and later use. However, it should be understood that any of a variety of condensation mechanisms may be used. For example, as discussed herein, one or more desiccant-based condensation mechanisms may be utilized to remove water vapor more effectively from the bulk air stream. Moreover, in certain embodiments the air-preconditioning system may be omitted, and raw air may be filtered and/or directed immediately into a condensation chamber. Such embodiments may have a lower input power requirement, and therefore the amount of power required for water generation may be decreased.

It should also be understood that certain preconditioning system embodiments comprise one or more filters (e.g., fabric-based air filters, non-woven based air filters, and/or the like), one or more refrigerant systems (e.g., warm air is passed through a heat-exchanger to lower the temperature of the air closer to the dew point), and/or the like in place of or in addition to the vortex and venturi valve mechanisms discussed herein.

Desiccant-Usage within an Atmospheric Water Generation System

As mentioned above, certain embodiments comprise one or more subsystems configured to increase the humidity of a portion of the source air to increase the amount of water that may be extracted from the source air. Specifically, water vapor may be extracted from a first, large quantity of source air, and may be reintroduced into a second, smaller quantity of source air, thereby consolidating the water vapor of the source air and increasing the humidity of the second quantity of source air before the water vapor in the second quantity of source air is condensed into liquid water.

AWG systems as discussed herein comprise at least one air scrubber comprising a column for contacting atmospheric air (e.g., after increasing the humidity of the air) with a desiccant. In certain embodiments, the desiccant solution may be a fluid, a gel, and/or the like within the typical operating temperature ranges discussed herein. The desiccant may be selected from any of a variety of ionic solutions capable of absorbing water, such as lithium-chloride (LiCl), lithium-bromide (LiBr), Calcium Chloride ($CaCl_2$), triethylene glycol, and/or the like. Other, unlisted chemical compounds having hygroscopic characteristics may be provided for use as the desiccant solution in certain embodiments. In embodiments described herein, liquid desiccant comprises a hygroscopic feed solution. The liquid desiccant may also be comprised of surfactants and/or nanofluids. In certain embodiments, the desiccant solution may comprise a mixture of a plurality of ionic solutions, such as a mixture of LiCl solution and $CaCl_2$ solution, The desiccant may be dissolved in water to provide a highly concentrated desiccant solution that may be pumped (e.g., via liquid pumps) through the at least one desiccant column. Other materials, including gels, aerogels, desiccant granules flowable subject to granular flow principles, and/or the like may be utilized in place of desiccant solutions in certain embodiments.

Moreover, the amount of water vapor that may be absorbed by the desiccant (and/or released by the desiccant) is dependent on the vapor pressure and temperature of a closed system including the desiccant. Accordingly, various embodiments are configured to absorb water from the air into the desiccant while the vapor pressure in the closed system is high and the temperature is low, and those same embodiments are configured to extract water from the desiccant while the vapor pressure is low, and the temperature is high.

Water Absorption from Atmospheric Air

Water may be extracted from air via one or more absorption modules. AWG systems (an example of which is shown as system 600 shown in FIGS. 3A-3B) may incorporate a single absorption module or multiple absorption modules. The absorption modules are connected with additional modules within the AWG system, including the water extraction module(s) discussed in greater detail below, such that the desiccant can flow between the water absorption module and the additional modules of the AWG system. Flow paths to and from the absorption modules within the overall AWG system may be configurable (e.g., configurable via valves between open and closed configurations), such that the absorption modules can operate as closed-modules in a batch-operating mode (with the desiccant flowing only within the absorption module and/or between multiple absorption modules) prior to passing the desiccant to water extraction modules. In other embodiments (e.g., when valves are in an open configuration, or in embodiments without valves), the desiccant flows freely between the absorption module(s) and the water extraction module(s), such as in a continuous flow operating configuration.

Figure 4A:
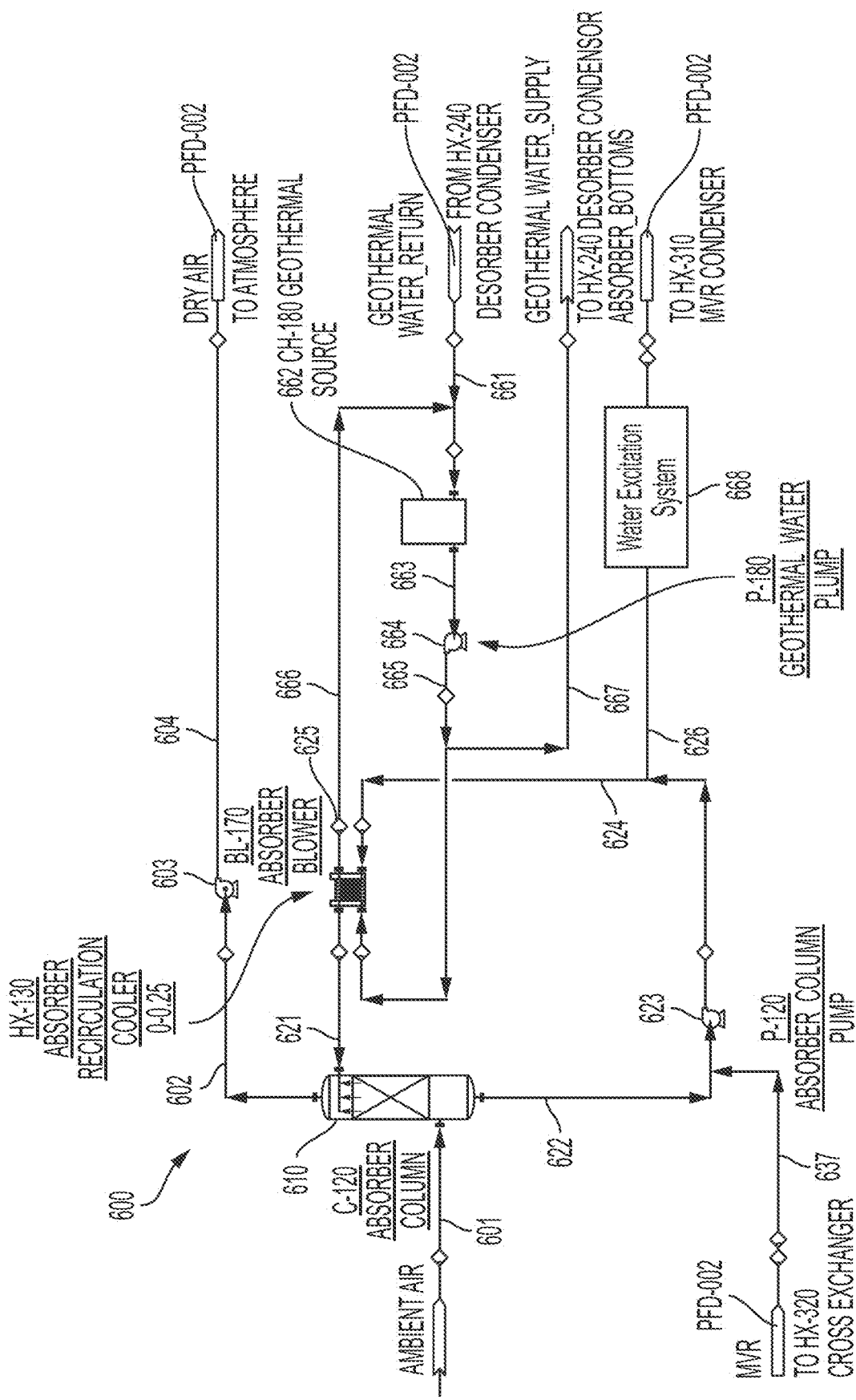
FIGS. 4A-4B shows a schematic diagram of an air pre-conditioning system and condenser according to another embodiment.

Moreover, as mentioned, air entering the absorption module(s) (e.g., via air flow path 601 entering absorber 610 and exiting absorber as dry air via flow path 602-604 shown in FIG. 4A) may flow from a pre-conditioning module configured for increasing the humidity of atmospheric air prior to extracting water from the atmospheric air within the absorber 610. In other embodiments, air may flow directly into the absorption module(s) from the surrounding atmosphere external to the AWG system.

The absorption module according to certain embodiments comprises an absorber 610 configured to contact ambient/atmospheric air (e.g., after preconditioning) with a desiccant (flowing through the absorber 610 along flow paths 621-622) so as to absorb water from the atmospheric air into the desiccant. The absorber 610 may be embodied as a vessel in which the desiccant flows between an inlet (via flow path 621) and an outlet (via flow path 622), and the ambient/atmospheric air flows between an air inlet (flow path 601) and an air outlet (flow path 602-604, inclusive of blower 603). Within the vessel, the ambient air contacts the desiccant to enable mass transfer of water vapor from the ambient air into the desiccant. In certain embodiments, one or more baffles, flow interrupters, packings (e.g., structured packing or random packing) may be placed within the absorber so as to increase the surface area of the desiccant and/or to increase the contact time between the ambient air and the desiccant.

In certain embodiments the absorber 610 is configured in a counter flow configuration where atmospheric air enters the absorber 610 proximate to the bottom of the absorber 610. Dry, atmospheric air then exits the absorber 610 proximate the top of the absorber 610 via a specific flow path (with a pump/blower 603 utilized to move air through the absorber 610). Rich desiccant (e.g., a desiccant fluid) enters proximate the top of the absorber 610 via an inlet flow path 621 and flows down through the interior of the absorber 610 due to gravity. Water is absorbed from the ambient air into the desiccant, such that dilute desiccant exits the absorber proximate to the bottom of the absorber 610 along an outlet flow path 622. In certain embodiments, flow modifiers, such as barriers, mesh, packing components, and/or turns in exit piping from the absorber 610 may be used to reduce carry over of desiccant in the air exit of the absorber 610. In certain embodiments the flow modifiers may be positioned in the interior of the absorber 610 proximate to the top of the absorber 610 (e.g., at a mouth of an exhaust port for dry ambient air to exit the absorber via an exhaust air flow path).

In certain embodiments, the absorber 610 operates in a cross-flow configuration where air enters the absorber from one the side of the absorber 610 and traverses (e.g., at least substantially horizontally) to the other side. Rich desiccant (e.g., desiccant fluid) enters the top of the absorber 610, absorbs water from the ambient air as it flows to a low point in the absorber 610 where dilute desiccant exits proximate the bottom. In this fashion, the air flow is at least substantially perpendicular to the flow of desiccant within the absorber 610. In this configuration, the air inlet and air outlet are approximately at the same height on the absorber 610.

In certain configurations, the absorber 610 is operated in the cross-counter flow configuration where air enters the absorber 610 from one the side of the absorber 610 and traverses to the other side. Rich desiccant (e.g., desiccant fluid) enters proximate the top of the absorber 610 and absorbs water from the ambient air as it flows to a low point in the absorber 610 where dilute desiccant exits proximate the bottom of the absorber 610. In this configuration, the air inlet and air outlet are offset in level from each other. In this configuration, the air inlet can be at the side of the absorber 610 at a location proximate to the top of the absorber 610 and the air outlet is on the side of the absorber 610 proximate to the bottom. In another orientation of this configuration, the air inlet is positioned on the side of the absorber 610 proximate to the bottom of the absorber 610 and the air outlet is positioned on the opposite side of the absorber 610 proximate to the top of the absorber 610. The air travels along a path extending at an angle through the absorber 610 from the top of the absorber 610 to the bottom or the bottom of the absorber 610 to the top.

Figure 5A:
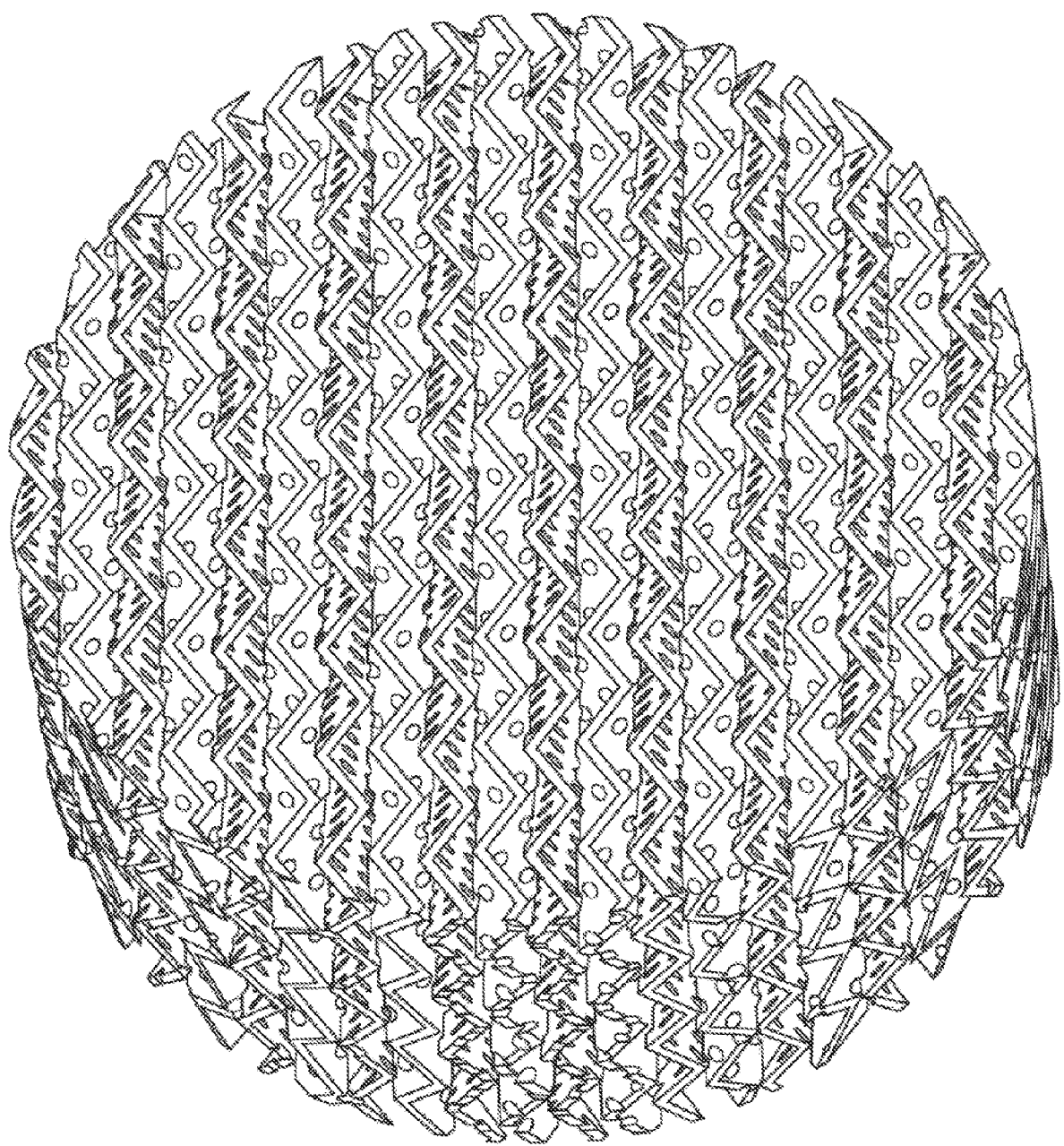
FIGS. 5A-5B illustrate example packing components within an absorber according to certain embodiments.
Figure 5B:
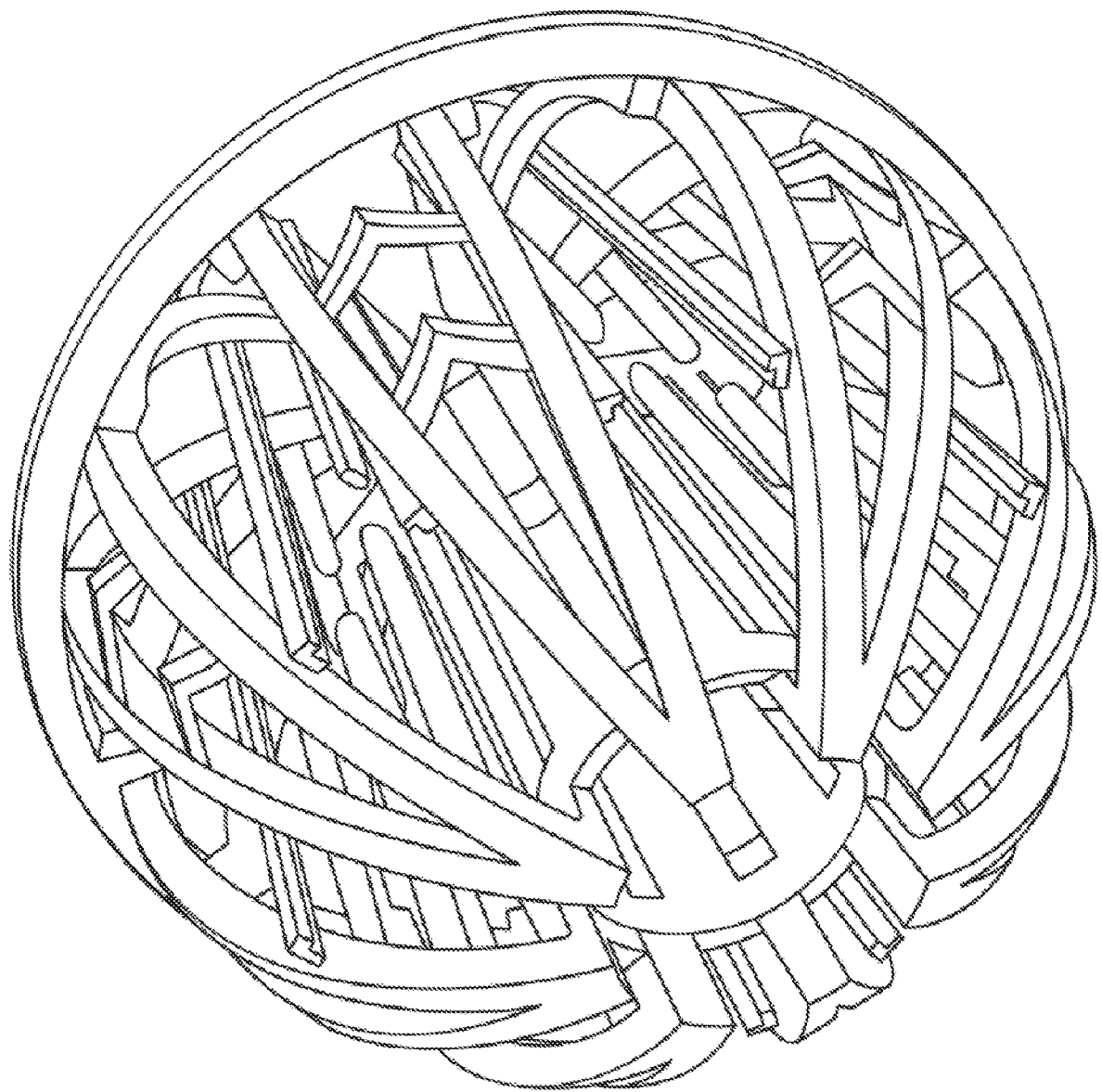

In certain embodiments, the interior of the absorber 610 comprises a plurality of packing components around which the rich desiccant flows as it absorbs water extracted from the humid ambient air. The packing components are provided to increase the surface area of the rich desiccant flowing within the absorber 610 and also to provide a highly tortuous flow path for ambient air flowing through the absorber 610 such that the air has a turbulent flow through the interior of the absorber 610. The absorber 610 may be embodied as a counter flow vessel described above, with the rich desiccant (e.g., desiccant fluid) entering the absorber 610 at a desiccant vessel inlet located at or near the top of the absorber 610, and the ambient air inlet is located at the bottom of the absorber 610. The ambient air flows upwards to a dry air exhaust located at or near the top of the absorber 610, and the desiccant fluid flows downward, across the packing components, to a dilute desiccant outlet of the absorber 610. As examples, the packing components may comprise individual blocks, balls, trays, baffles and/or any other shape defining a plurality of baffles, slits, holes, meshes, and/or other flow modifying components that may be positioned within the absorber 610 to collectively define a highly tortuous path for the ambient air and the desiccant fluid to pass through the absorber 610. The packing components may comprise (be formed of) a material that is not reactive to the desiccant fluid. Example packing components are illustrated in FIGS. 5A-5B. In certain embodiments, a plurality of packing components (such as the unstructured packing component shown in FIG. 5B) may be positioned within the absorber 610 without physically connecting the packing components relative to one another. In other embodiments, a single packing component (such as the structured packing example of FIG. 5A) sized and shaped specifically for the interior of the absorber 610 may be provided and positioned within the absorber 610.

The packing components of certain embodiments may be placed in a structured configuration to define channels set at different angles to each other with or without holes that collectively define structured flow paths for the ambient air and the desiccant fluid flowing through the absorber 610. To provide a structured packing configuration, the packing components are placed in the absorber 610 in an ordered stacked manner. Packing components can also be positioned randomly in which a plurality of geometrically shaped components are randomly placed in the absorber 610 to increase surface area. Although discussed as a packing-based absorber, it should be understood that the desiccant fluid can be passed through the absorber 610 via other configurations, such as by atomization of a liquid desiccant fluid, by spraying the desiccant fluid within the absorber and/or the like).

In use of an overall AWG system, ambient air (at an ambient temperature and an ambient humidity level) is directed into absorber 610 (although not shown, a blower may be implemented at the air intake to the absorber 610 to increase the volumetric flowrate of ambient air entering the absorber 610). In the absorber 610, the ambient air contacts a rich (concentrated) desiccant (e.g., desiccant fluid) provided to the absorber 610 at a low temperature, to increase the vapor pressure within the absorber to encourage water vapor within the humid ambient air to condense and to be absorbed by the desiccant fluid while the humid air contacts the rich desiccant. While the ambient air and the desiccant fluid flow through the absorber 610, humidity within the air condenses and/or is otherwise absorbed into the desiccant fluid to dilute the desiccant fluid and to dry the air. The dry air then exits the absorber back to the atmosphere, as indicated at 602. As shown, a blower 603 may be incorporated at an ambient air exhaust of the absorber 610 to increase the volumetric flowrate of air passing through the absorber 610. The blower 603 may be provided in addition to, or as an alternative to, the above-mentioned blower placed at the ambient air intake of the absorber 610. Moreover, once the desiccant fluid has passed through the absorber 610, a diluted, but still cool, desiccant fluid exits the absorber 610 as indicated at reference 622.

According to certain embodiments, dilute desiccant (e.g., a desiccant fluid) exits the absorber 610 to a pump 623. In certain operation, the absorber module can be operated in a batch configuration where a series of valves may be configured to isolate the absorber module from other portions of the AWG system, and to thereby recirculate the dilute desiccant along a recirculation flow path (while additional rich desiccant fluid is prevented from entering the closed loop via flow path 637 while appropriate valves remain closed) and through a pre-absorber heat exchanger 625 (e.g., a shell-and-tube heat exchanger, a plate heat exchanger, and/or the like) to cool the dilute desiccant (the opposite side of the heat exchanger is cooled water that has been collected from the overall system, as discussed in greater detail herein) before it is passed back into the top of the absorber 610 as indicated at 621. In this way, the amount of water absorbed into the desiccant fluid may be increased (thereby increasing the level of dilution of the desiccant) before the desiccant is directed to evaporation portions of the overall system.

In certain embodiments, the absorption module comprises a pre-absorber heat exchanger 625 that is cooled through the use of a chiller using a cooling media (e.g., water, glycol, and/or the like) that cools the rich desiccant flowing into the pre-absorber heat exchanger via flow path 624 (e.g., the cooling media is separated from the desiccant, such as on opposite sides of a heat exchanger) before the rich desiccant enters the absorber 610.

In certain operation, the absorber module can be operated in a continuous configuration where valves are configured to recirculate a certain amount of dilute desiccant fluid along the recirculation flow path and a certain amount of dilute desiccant fluid flows toward the water extraction module through a separate flow path (flow path 626) connecting the absorption module and the water extraction module. In this configuration, a certain amount of dilute desiccant fluid flows along the recirculation flow path through the pre-absorber heat exchanger 625 (e.g., a shell-and-tube heat exchanger, a plate heat exchanger, and/or the like) to cool the dilute desiccant fluid (the opposite side of the heat exchanger 625 is cooled using water that has been collected from the overall system) before it is passed back into the top of the absorber 610 as indicated at 621. Dilute desiccant fluid simultaneously traverses along a separate flow path 626 to the water extraction module. The cooling fluid passes through flow paths 661-667, which encompasses a recirculation loop of fluid, as well as a cooling system 662 and pump 664 that ensures adequate flow of fluid through the pre-absorber heat exchanger 625. Portions of the fluid return to a fluid store via flow path 667.

In certain embodiments, the absorber 610 is configured such that the rich desiccant is not cooled in a heat exchanger. In this embodiment, cooling of the desiccant fluid may be provided via thermal conductive heat exchange with ambient air through the conductive pipes along certain flow paths leading to an intake of the absorber. Fluid cooling may be provided in the absorber 610 as sensible heat is exchanged with the atmospheric air, provided that the air temperature is lower than the entering desiccant fluid temperature.

As just one example, rich desiccant fluid moving toward the absorber 610 may be directed through a series of geothermal tubes having heat transfer properties with surrounding ground beneath the AWG system. The rich desiccant fluid may directly pass through the series of geothermal tubes, or the rich desiccant fluid may pass through a dual-fluid heat exchanger opposite a cooling fluid that is maintained at a desired low temperature via geothermal cooling. As yet another example, the desiccant may pass through a heat exchanger (e.g., a shell-and-tube heat exchanger) to cool the desiccant fluid. The heat exchanger may be cooled via a cooling solution that passes through a refrigeration circuit and/or other fluid chiller to absorb heat from the desiccant fluid before the desiccant fluid enters the absorber 610.

As yet another example, the single-stage water consolidation system may be positioned proximate a high-pressure gas well, such as proximate a natural gas well, an oil well (where natural gas is extracted simultaneously with oil), and/or the like. The high-pressure gas may be directed through one or more expansion valves to regulate and/or decrease the pressure of the incoming gas, which, through the Joules-Thompson effect, experiences a rapid temperature decrease (following the gas law formula, the pressure of the gas rapidly decreases across the valve while the volume and amount of gas remains substantially constant, thereby causing a proportional rapid temperature decrease across the expansion valve). The expanded and super-cooled gas may be passed through a heat exchanger opposite the rich desiccant fluid, thereby absorbing heat from the rich desiccant fluid and decreasing the temperature of the desiccant fluid prior to entry into the absorber 610. The expanded gas may then be directed away from the AWG system, where it may be collected for future use, flared off, utilized for power generation (e.g., via a steam turbine), and/or utilized to heat the desiccant fluid entering the water extraction module, as discussed herein.

In certain embodiments the absorber 610 is configured such that the diluted desiccant fluid exits the absorber 610 and is sent to the water extraction module without a recirculation path. Rich desiccant fluid returning from the water extraction module may or may not be cooled with a heat exchanger and/or chiller and/or geothermal cooling prior to entering the absorber 610. For example, dilute desiccant that exits the absorber 610 is pumped along a flow path extending between the absorption module and the water extraction module when appropriate valves are closed to prevent the dilute desiccant from recirculating into the absorber 610 as discussed above.

In certain embodiments, the absorber 610 may be embodied as a membrane-separated absorber, having a desiccant flow path on a first side of a porous membrane, and an air flow path on an opposite, second side of the porous membrane. Separating the air flow path from the desiccant solution flow path may impede undesirable mass flow of the desiccant salt (e.g., aqueous desiccant salt) itself into the air flow path and ultimately out of the AWG system. Water may be absorbed by the desiccant from the air based on osmotic water flow through the membrane from the air to the desiccant solution. Water vapor may condense on the second side of the membrane, travel through the membrane pores through capillary action, and be absorbed by the high-salt content concentrated desiccant solution. In certain embodiments, the membrane is embodied as a porous membrane, having pores of adequate size (e.g., average pore diameter, maximum pore diameter, and/or the like) to enable water molecules to pass through the membrane while the desiccant salt is prevented from passing through the membrane. As examples, the porous membrane may be a non-woven material, such as polytetrafluoroethylene (PTFE), expanded polytetrafluoroethylene (ePTFE), polypropylene (PP), polyvinylidene fluoride (PVDF), and/or the like. Other materials, including nylons and/or other synthetic materials may additionally be used in certain embodiments. In various embodiments, synthetic and/or natural materials may be utilized. The porous membrane may be at least partially woven in certain embodiments. In certain embodiments, the membrane may be organic, inorganic, polymeric, mesoporous, ceramic, and/or the like. In certain embodiments, the membrane may comprise metal organic frameworks, carbon nanotubes and/or a combination thereof. The membrane may be hydrophilic and/or hydrophobic or may be treated (e.g., with a coating) to allow the membrane to be hydrophilic and/or hydrophobic. As example membrane geometries, the membrane may be spiral wound, flat plate and frame style, or tubular. As the desiccant solution and the water flow past opposite sides of the membrane, water molecules migrate from the desiccant solution through the membrane (via capillary action), to the permeate water flow (e.g., water vapor and/or liquid water). In certain embodiments, the membrane may be supported within a frame via spacers, such as a lattice, a grid, and/or the like to provide mechanical support for the membrane to maintain a desired orientation of the membrane within the housing.

Various embodiments of the absorption module comprise a multi-stage absorber configuration, including a plurality of absorbers arranged in series (such that the desiccant flows from a first absorber, through a second absorber, and sequentially through additional absorbers within the multi-stage absorber configuration. Alternatively, the multi-stage absorber configuration encompasses a plurality of absorbers arranged in parallel, such that the desiccant is split to flow through the plurality of absorbers in parallel.

Moreover, the plurality of absorbers may be arranged in series within the air flow path, such that source air may be pulled from the environment and passed through the plurality of absorbers in series prior to being exhausted back to the environment as dry air. For example, the source air may be first passed through the low concentration absorber to absorb a first quantity of water from the air, then may be passed through the high concentration absorber to absorb a second quantity of water from the air. Because the initial absorption requires less energy (and does not require a low vapor pressure between the air and the liquid desiccant), the initial absorption using the lower concentration desiccant fluid enables absorption of a first quantity of water from the air. After the initial, low energy requirement absorption process is completed, the air (which still contains water vapor) is passed through the second absorber having a higher concentration desiccant fluid, such that a second quantity of water is absorbed from the air. The now dry (e.g., low humidity) air may then be exhausted from the system to the environment.

On the desiccant side, once the dilute desiccant exits the low concentration absorber, the desiccant fluid passes to a water extraction module as discussed herein to extract water therefrom (and to consequently reconcentrate the desiccant).

In certain embodiments, each absorber may be in fluid communication with a corresponding water extraction module, such that each absorber is associated with a separate and independent desiccant flow path loop. For example, a first quantity of desiccant fluid may flow between a first absorber and a first water extraction module, and a second desiccant fluid may flow between a second absorber and a second water extraction module, and the first quantity of desiccant fluid does not mix with the second quantity of desiccant fluid. In certain embodiments, the first quantity of desiccant fluid may comprise a first desiccant (e.g., LiCl) and the second quantity of desiccant fluid may comprise a second desiccant (e.g., CaCl).

Moreover, in embodiments comprising a plurality of independent desiccant flows, each desiccant flow may have a different concentration range. For example, a first desiccant flow (e.g., corresponding to a first absorber passed through by source air) may have a first concentration range measured between a high concentration value at an exit of the water extraction module and a low concentration value at an exit of the absorber; and a second desiccant flow may have a second concentration range. As the source air is directed through the absorption columns in series, the air may be directed through a low concentration range absorption column first and may be directed through a high concentration range absorption column second.

Membrane-Based Water Extraction from a Desiccant

The water extraction module is provided to remove water from a diluted desiccant (e.g., from a diluted desiccant fluid) for storage and use as potable or other clean liquid water uses. The water extraction module comprises one or more membrane-based water extraction devices (e.g., connected in series or in parallel) and is connected to the absorption module via various flow paths to enable desiccant (e.g., diluted desiccant and rich desiccant) to flow between the absorption module and the water extraction module. The membrane-based water extraction device (also referred to as a fluid separation device) also acts to concentrate the desiccant solution into a concentrated desiccant retentate solution which may be reprocessed through the atmospheric water generation system.

Figure 4B:
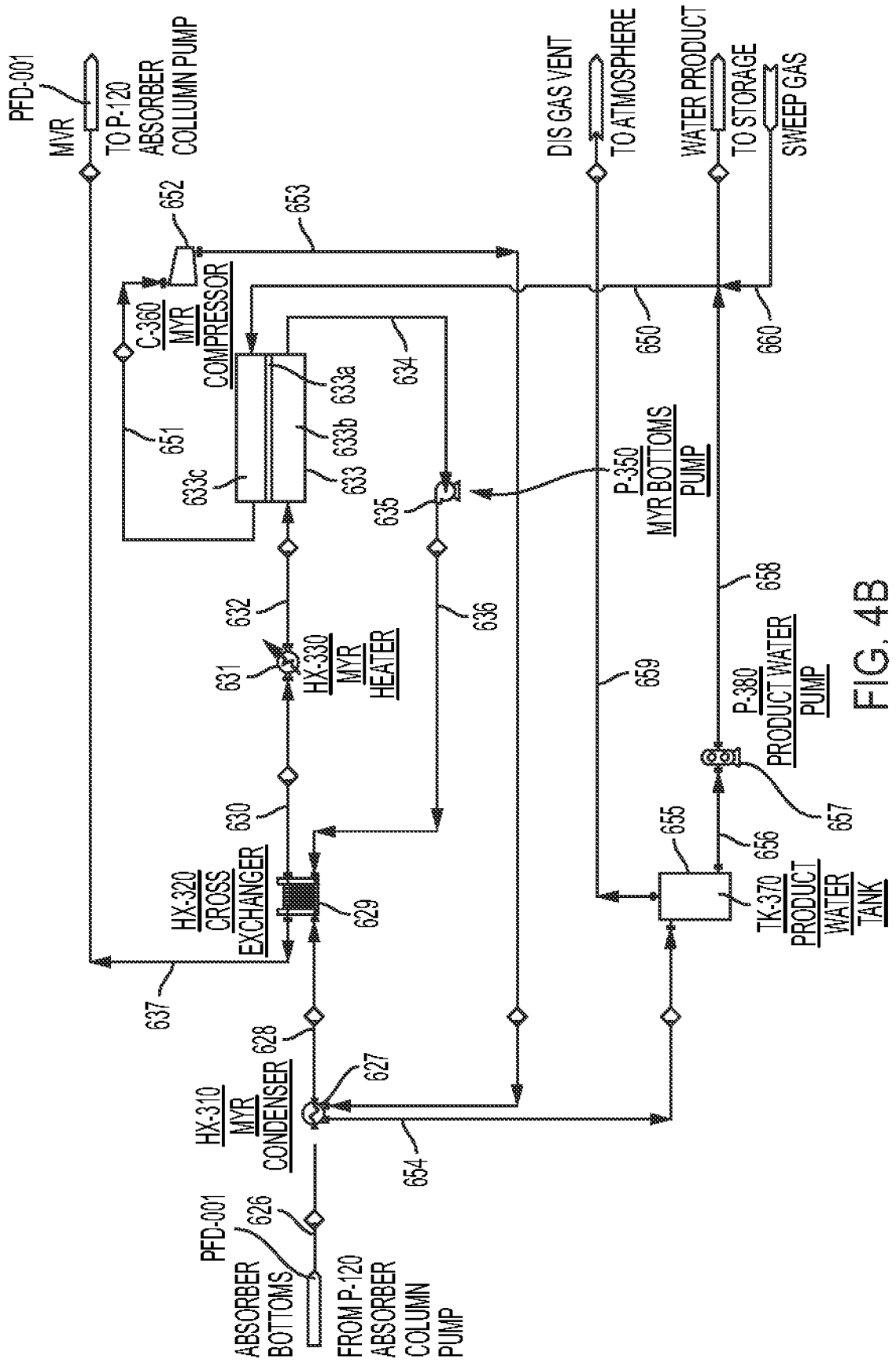

The water extraction module comprises at least one membrane-based water extraction device 633 defining two flow paths separated by a permeable membrane 633a (FIG. 4B). On a first side of the permeable membrane 633a, the desiccant flows along a desiccant flow path (between flow path 632 and flow path 634) and on the opposite, second side of the permeable membrane, permeated fluid (e.g., water vapor) is captured then transferred (within portion 633c, located within the water extraction device between flow path 650 and flow path 651). Both the desiccant (on the first side 633b of the permeable membrane 633a) and the captured permeate fluid (on the second side 633c of the permeable membrane 633a) are in contact with opposite sides of the permeable membrane 633a while flowing past the permeable membrane 633a. The membrane 633a may thereby separate the desiccant flow path from the captured permeate (water vapor) flow path, which comprises water vapor collected during the water collection/fluid separation process (e.g., water vapor that migrates through the porous membrane 633a) and condenses into a liquid permeate water flow (e.g., downstream of the membrane-based water extraction device). In certain embodiments, mass transfer of water vapor across the membrane 633a may be driven by raising the vapor pressure of the desiccant. This may be accomplished by heating of the desiccant prior to contact with the membrane 633a (on the desiccant side 633b of the membrane). Lowering the pressure (e.g., by using a vacuum mechanism) to reduce the pressure on the permeate side 633c of the membrane 633a, also causes mass transfer of water vapor across the membrane. As the desiccant flows past the porous membrane 633a (on the first, desiccant side 633b of the membrane), the water in the desiccant begins permeation across the membrane 633a in the vapor state and exits the membrane 633a (on the second side) in the vapor state. The water vapor then condenses as it cools and flows along the water flow path (e.g., at least partially by utilizing a heat exchanger (e.g., condenser 627) and/or contacting it with a colder fluid (e.g., condensed water)).

In certain embodiments, the desiccant side 633b may be heated by a heating fluid (e.g., heating oil, steam, glycol, and/or the like) that is separated from the desiccant flow path within the membrane-based water extraction device via a heat-conductive layer (e.g., a heat-conductive, non-porous film, a metal sheet, and/or the like). In certain embodiments, the desiccant side 633b may be embodied as a shell-and-tube heat exchanger, with the heating fluid flowing through tubes and the desiccant flowing through the shell, with certain wall(s) of the shell being embodied as the porous membrane 633a. In certain embodiments, the heating fluid may be a product of the AWG system, thereby utilizing sensible heat transfer to heat the desiccant fluid to encourage water vapor migration across the membrane. In other embodiments, the heating fluid may be a product (e.g., a final product, a waste product, or an intermediate product) of a spatially proximate process, such as mining, gas extraction, power production, and/or the like.

As discussed in greater detail herein, the permeate side 633c may similarly comprise a heat-exchanger configuration to lower the temperature of the permeate fluid to encourage condensation thereof. For example, a cooling fluid (e.g., liquid water extracted from a liquid water storage tank 655, a refrigerant (e.g., glycol), and/or the like) may be separated from the permeate flow path by a heat-conductive layer (e.g., a heat-conductive, non-porous film, a metal sheet, and/or the like). The cooling fluid cools the heat-conductive layer, thereby providing a surface within the permeate fluid flow on which water vapor can condense. In certain embodiments, the permeate side 633c may be embodied as a shell-and-tube heat exchanger, with the cooling fluid flowing through tubes and the permeate fluid flowing through the shell, with certain wall(s) of the shell being embodied as the porous membrane 633a. In such embodiments, the outer surfaces of the tubes are provided as condensation surfaces for the water vapor. In certain embodiments, the cooling fluid may be a product of the AWG system (e.g., liquid water), thereby utilizing sensible heat transfer to cool the permeate to encourage water vapor migration across the membrane and to encourage condensation of the water vapor.

The membrane 633a may comprise a hydrophobic porous membrane, such as non-woven membrane having a small pore size. As just one example, the membrane may comprise PTFE, ePTFE, PP, PVDF, and/or the like, that is hydrophobic by design. In certain embodiments, the membrane may be organic, inorganic, polymeric, mesoporous, ceramic, and/or the like. In certain embodiments, the membrane may comprise metal organic frameworks, carbon nanotubes and/or a combination thereof, such as by stacking layers of material. The membrane may be hydrophilic or hydrophobic or may be treated (e.g., with a coating) to allow the membrane to be hydrophilic and/or hydrophobic. The use of a hydrophobic material (or a material having a hydrophobic coating) encourages water vapor to selectively pass through the membrane to be retained on the permeate water side 633c of the membrane. Adhering a layer of hydrophobic material to the membrane on the desiccant side 633b causes only volatile vapors to pass through and fluids in the liquid state are retained on the desiccant side 633b of the membrane. As examples of membrane geometries, the membrane may be spiral wound, flat plate and frame style, or a hollow tube. As the desiccant solution flows across the desiccant side 633b of the membrane, water molecules migrate from the desiccant solution through the membrane (via capillary action) in the form of vapor, to the permeated water side 633c, leaving a highly concentrated desiccant solution on the desiccant side 633b of the membrane 633a.

The membrane-based water extraction device 633 is embodied as a housing having a desiccant inlet and a desiccant outlet on the desiccant side 633b of the membrane 633a, and a permeate inlet and a permeate outlet on the permeate side 633c of the membrane 633a. In other example embodiments, the membrane-based water extraction device 633 may utilize gravity to remove permeate fluid from the membrane-based water extraction device 633, and in such embodiments, the permeate flow path need not include an inlet (such that gravity alone is sufficient to move the permeate fluid through an outlet of the device). For example, as the desiccant fluid flows from an inlet to an outlet of the membrane-based water extraction device, water vapor migrates through the membrane into vapor form on a permeate side of the membrane. The permeate side of the membrane may be cooled (e.g., using a cooling fluid separated from the permeate side of the membrane by a heat-conductive film), and water may condense within the permeate side of the membrane-based water extraction device and may fall (under the force of gravity) through an outlet port located on a bottom end of the permeate-side of the membrane.

The desiccant flow path extends between the desiccant inlet and the desiccant outlet. The permeate (water) flow path extends between the permeate inlet and the permeate outlet. In certain embodiments, the permeate outlet may be located below (and on an opposite end of the membrane-based water extraction device) the permeate inlet so as to utilize the force of gravity to encourage flow of permeate out of the membrane-based water extraction device. As mentioned above, each of the desiccant flow path and the permeate flow path interface the porous membrane 633a on opposite sides thereof. By separating the desiccant fluid from the permeate flow, the membrane 633a impedes mass transfer of dissolved solids from the desiccant into the resulting permeate flow, thereby preserving the desiccant for continuous usage and preserving the purity of the captured water. Similarly, the membrane impedes migration of a gas (e.g., a sweep gas) on the permeate side of the membrane 633a from permeating into the desiccant flow.

Figure 6A:
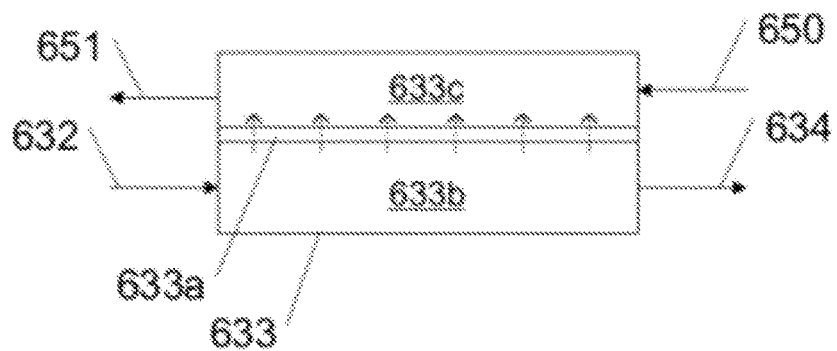
FIGS. 6A-6E illustrate example configurations of a membrane-based water extraction device according to various embodiments.

In certain embodiments, the housing defines two parallel flow paths that contact opposite sides of the porous membrane 633a in a counter-cross flow manner as illustrated in FIG. 6A, with the first flow path being the desiccant flow path 633b and the second flow path being the permeate flow path 633c, and the porous membrane 633a is embodied as a planar membrane (e.g., defined within a frame) that separates the desiccant flow path 633b from the permeate flow path 633c. In certain embodiments, the housing is configured to grant access to the porous membrane for maintenance purposes, such as to replace the membrane as needed. In other embodiments, a first flow (e.g., the desiccant flow) may flow in a horizontal direction across the surface of the membrane 633a) and a second flow (e.g., the permeate flow) may flow in a vertical direction across the opposite surface of the membrane, such as with the outlet of the permeate flow being below the inlet of the permeate flow.

Figure 6B:
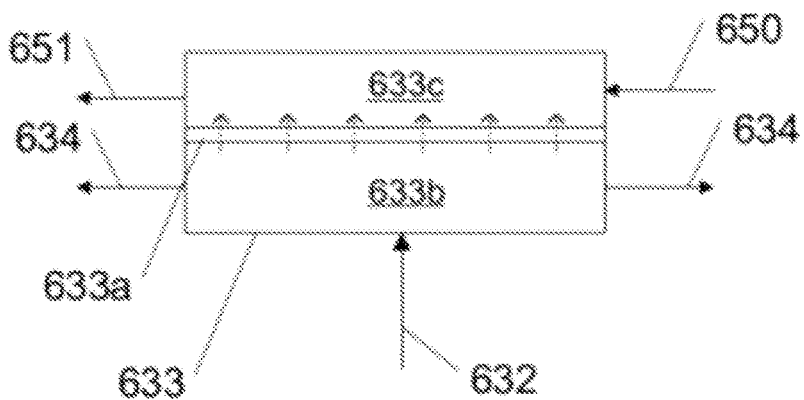

In other embodiments, the desiccant flow path may be defined by a desiccant inlet that directs the desiccant toward the membrane (e.g., at a perpendicular angle or an at least substantially perpendicular angle relative to a first side of the membrane), and the desiccant is directed toward an outlet after the desiccant contacts the membrane. This embodiment is a dead end-style flow, where inlet desiccant interfaces the porous membrane in an at least substantially normal (perpendicular) direction of the permeate flow path on the opposite side of the membrane. In this embodiment, the permeate flow path flows parallel to the porous membrane. An example of this configuration is illustrated in FIG. 6B.

Figure 6C:
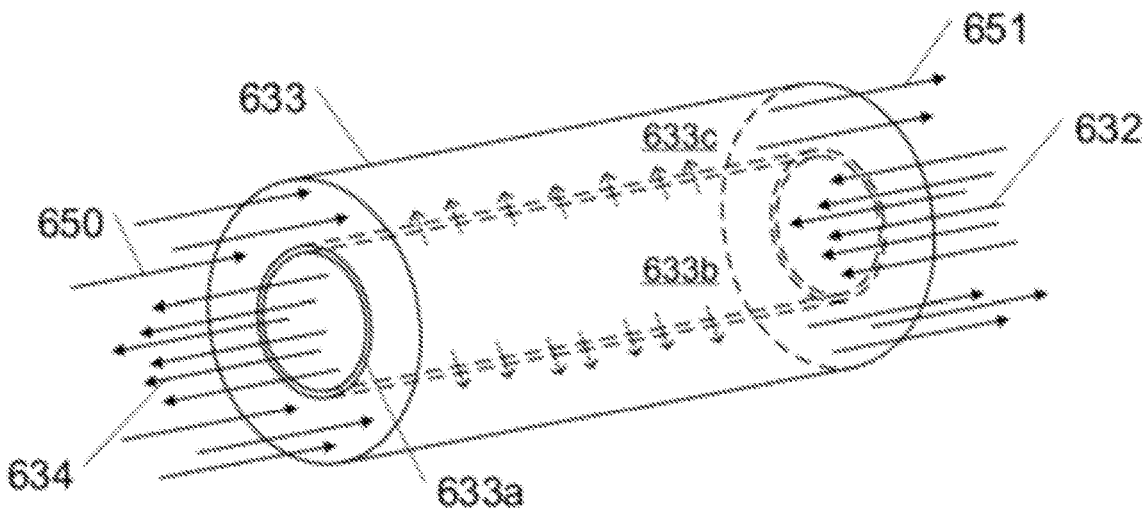

In yet other embodiments as illustrated in FIG. 6C, the housing may define a lumen-style flow path, with a first flow path being at least substantially concentric to a second flow path. Walls of the first flow path (separating the first and second flow path) may be at least partially defined by the porous membrane. In certain embodiments, the porous membrane may extend partially around the first flow path. In other embodiments, the porous membrane may extend around an entirety of the first flow path. As just one example, the first, interior flow path may be the desiccant flow path, and the second, outer flow path may be the permeate flow path, such that permeate water migrates through the porous membrane from the interior flow path to the exterior flow path. As another example, the first, interior flow path may be the permeate water flow path and the second, outer flow path may be the desiccant flow path, such that permeate water migrates through the porous membrane from the exterior flow path to the interior flow path.

In the lumen-style flow of the membrane-based water separation device, the permeate flow path and the desiccant flow paths may extend in the same co-current direction or in counter-current (opposite flow) directions. In certain embodiments, the flows may be horizontal, or vertical. In a vertical orientation, the permeate side may flow downward, thereby utilizing gravity to facilitate flow of the water (after condensation) out of the membrane-based water separation device.

To achieve separation of water from the desiccant solution, a difference in chemical potential is introduced. This may be realized in a temperature gradient across the membrane, a pressure gradient across the membrane, and/or a concentration gradient across the membrane between the desiccant flow path 633b, the membrane 633a, and the permeate flow path 633c. A temperature gradient across the membrane may be achieved by heating the desiccant fluid path 633b and/or cooling the permeate liquid water path 633c. The temperature of the desiccant fluid and/or the liquid water may be manipulated through the use of any heating/cooling source to include but is not limited to, heat exchangers, heating elements, waste heat, geothermal heat, solar heating, geothermal cooling, chilling, cooling pond, cooling stream, sweep gas, and/or the like. For example, the membrane-based water extraction device may incorporate a heat-exchanging configuration, such as across a non-porous film on a desiccant side of the membrane (e.g., a heating fluid may heat the desiccant fluid as it flows across a surface of the membrane) and/or a cooling configuration may be incorporated on the permeate side of the membrane (e.g., a cooling fluid separated from the permeate fluid across a non-porous film may cool the permeate fluid). A pressure gradient across the membrane may be achieved by high pressure on the desiccant side of the membrane and/or low pressure on the liquid water side of the membrane. The difference in pressure between the desiccant side of the membrane and permeate side of the membrane is not limited to but may be introduced by the following mechanisms, high pressure pumps, pumps, blowers, compressors, vacuum pumps, venturi vacuum induction mechanisms, and/or the like. Moreover, one or more pumps and/or agitators may be utilized on the desiccant side or the permeate water side to ensure homogeneity of properties of the desiccant and/or liquid water. Ultimately, the difference in pressure and/or temperature may provide a difference in vapor pressure on the two sides of the membrane so as to encourage water vapor to migrate through the membrane from the desiccant side of the membrane to the permeate/water-vapor side of the membrane. Specifically, the vapor pressure on the permeate side of the membrane may be lower than the vapor pressure on the desiccant-side of the membrane (e.g., to utilize an induced vacuum to drive permeation of the water through the membrane).

In certain embodiments, the membrane-based water extraction device is configured to utilize the mechanisms mentioned above to drive chemical potential. In one example incorporating vacuum membrane distillation (VMD), the permeate outlet path 651 is pressurized to a vacuum pressure (e.g., utilizing one or more vacuum pumps located downstream of the membrane-based water extraction device 633 along the permeate flow path, such as at compressor 652) to induce a pressure gradient across the membrane 633. As just one example, a vacuum pump may be located in the permeate water storage tank 655 and/or along flow path 659 of a gas vent from the water storage tank 655. In this embodiment, the absolute pressure on the desiccant side 633b is greater than the absolute pressure on the permeate side 633c. The interior of the membrane-based water extraction device may be analogous to that shown in FIGS. 5A-5C. In certain embodiments, additional components, such as a heating fluid flow and/or a cooling fluid flow (as discussed below) may additionally be incorporated into the VMD configuration of the membrane-based water extraction device to further enhance the efficiency of the water extraction process.

Another example embodiment utilizes air gap membrane distillation (AGMD) processes to drive permeation of water vapor across the membrane 633a to the permeate side 633c of the membrane 633a. Example AGMD configurations are shown in FIGS. 5D-5E, each of which provides for the permeate side of the membrane 633c to carry a cooling fluid along a cooling fluid flow path that is separated from the permeate flow path 633c by a heat-conductive, non-porous film (e.g., cooling water directed from storage tank 655, along flow path 658 to flow path 650 and into the membrane-based water extraction device 633 on the permeate side 633c of the membrane 633a). The cooling fluid flowing along flow path 633d sandwiches an air gap between a non-porous membrane 633e (separating the cooling fluid flow path 633d from the permeate side 633c of the membrane) and porous membrane 633a. The created air gap is formed with non-porous membranes 633e that promote condensing via heat transfer. The air gap serves as a path for condensates once they have separated from the desiccant via porous membrane. The cooling fluid is at a temperature below the heated desiccant fluid, thereby creating a temperature gradient starting from the heated desiccant side of the module 633b and finishing at the cool non-porous membrane holding the cooling fluid. The cool side also causes the transferred vapors to condense into a liquid state. A higher temperature gradient (a greater difference between the heated desiccant fluid and the cooling fluid) creates a greater driving force to separate water molecules within the concentrated desiccant across the porous membrane, thus achieving greater separation performance for the membrane-based water extraction device. As discussed above, the water vapor within the air gap may be directed out of the housing of the membrane-based water extraction device based on a vacuum created within the air gap, based on a sweep gas flowing through the air gap, and/or based on gravity that forces condensed water to flow downward and out through an outlet located at a bottom end of the air gap. In certain embodiments, the housing defines three outlets: a desiccant outlet (to flow path 634), a permeate outlet (to flow path 651), and a cooling fluid outlet (to recirculate cooling fluid along a cooling fluid flow path). In certain embodiments, the housing defines at least two inlets (when an inlet is not required for the permeate fluid, such as when gravity is utilized to direct the permeate fluid to exit the air gap) comprising a desiccant inlet (from flow path 632) and a cooling fluid inlet (e.g., from flow path 650). In other embodiments, the housing defines at least 3 inlets (when a permeate flow inlet is required, such as when utilizing a vacuum pressure or a sweep gas to direct the permeate out of the housing), comprising a desiccant fluid inlet (from flow path 632), a permeate fluid inlet (e.g., to enable a gas flow through the permeate side 633c of the membrane), and a cooling fluid inlet (e.g., from flow path 650).

Although illustrated as a flat-plane non-porous membrane 633d, it should be understood that the permeate side of the membrane 633a may be embodied as a shell-and-tube heat exchanger configuration (with the walls of the tubes embodying the non-porous film 633e and the cooling fluid flowing within the interior of the tubes).

Figure 6D:
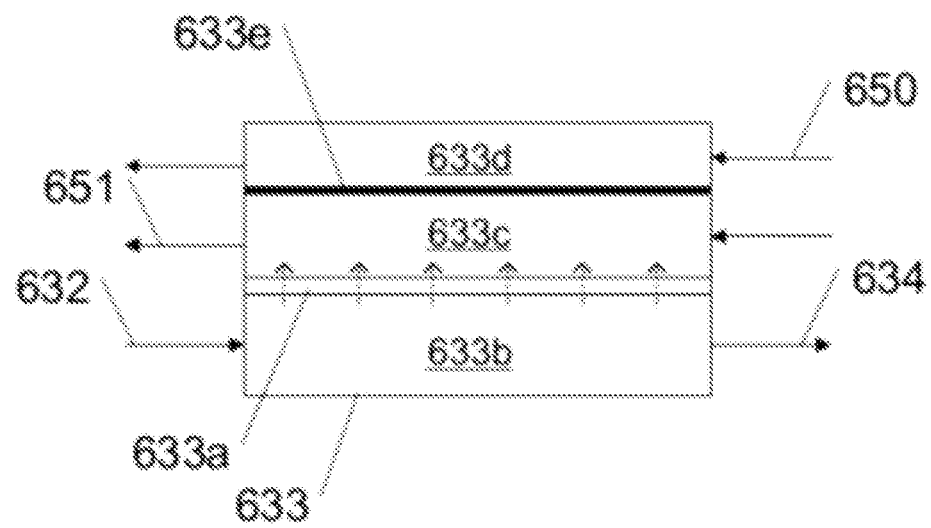
Figure 6E:
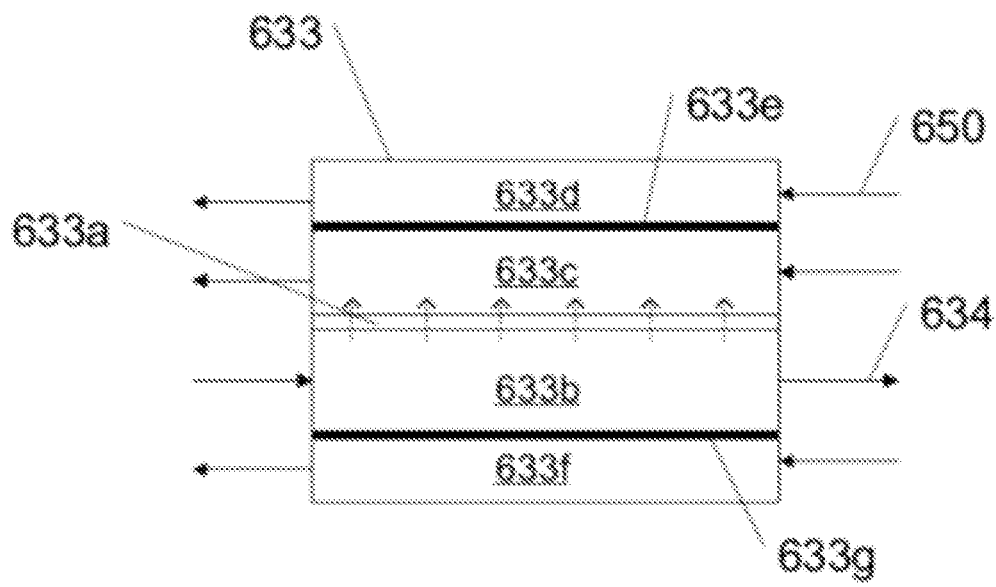
Figure 7A:
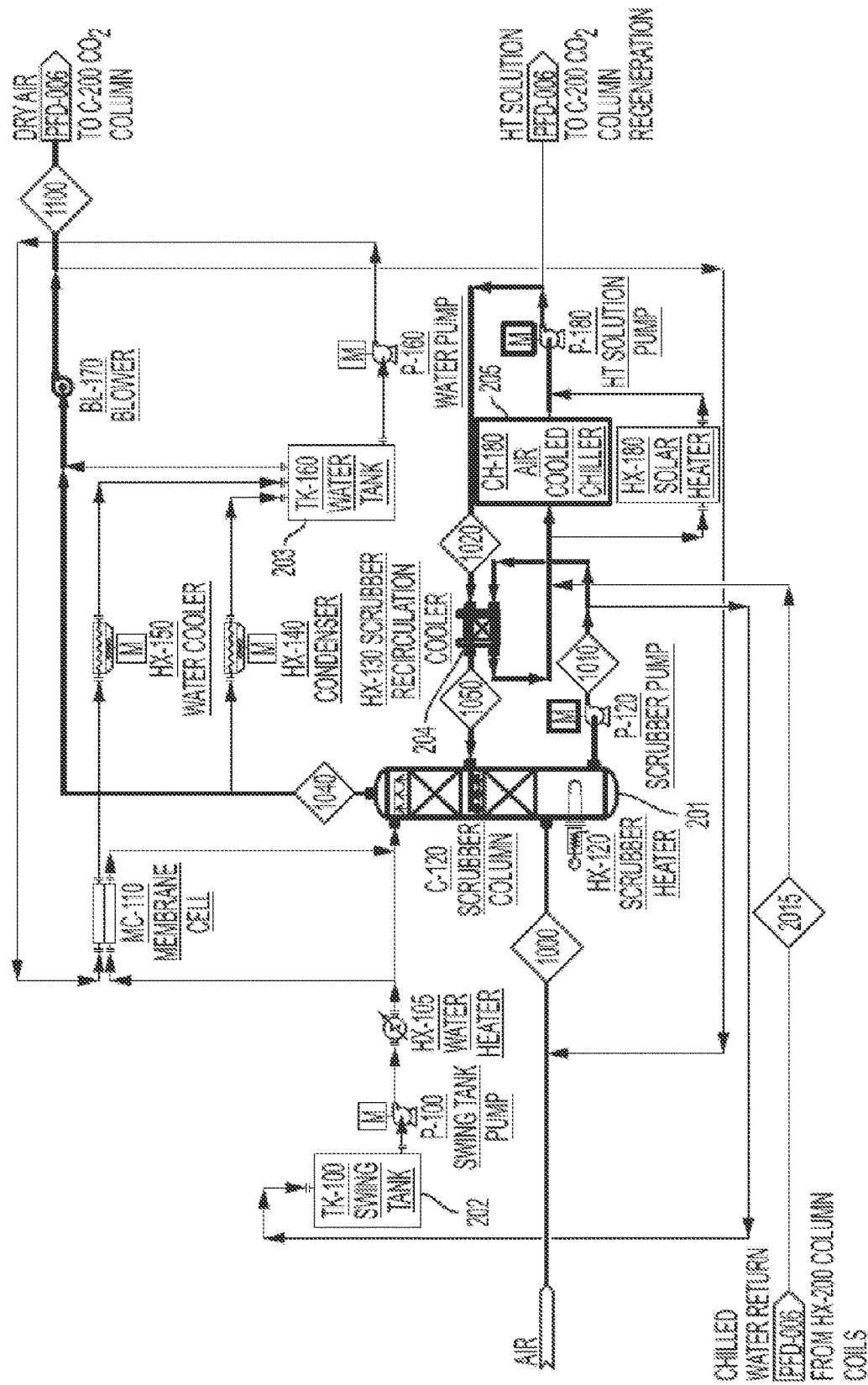
FIGS. 7A-7B show schematic diagrams of a batch vapor consolidation system in line with a vapor condensation system according to one embodiment.
Figure 7B:
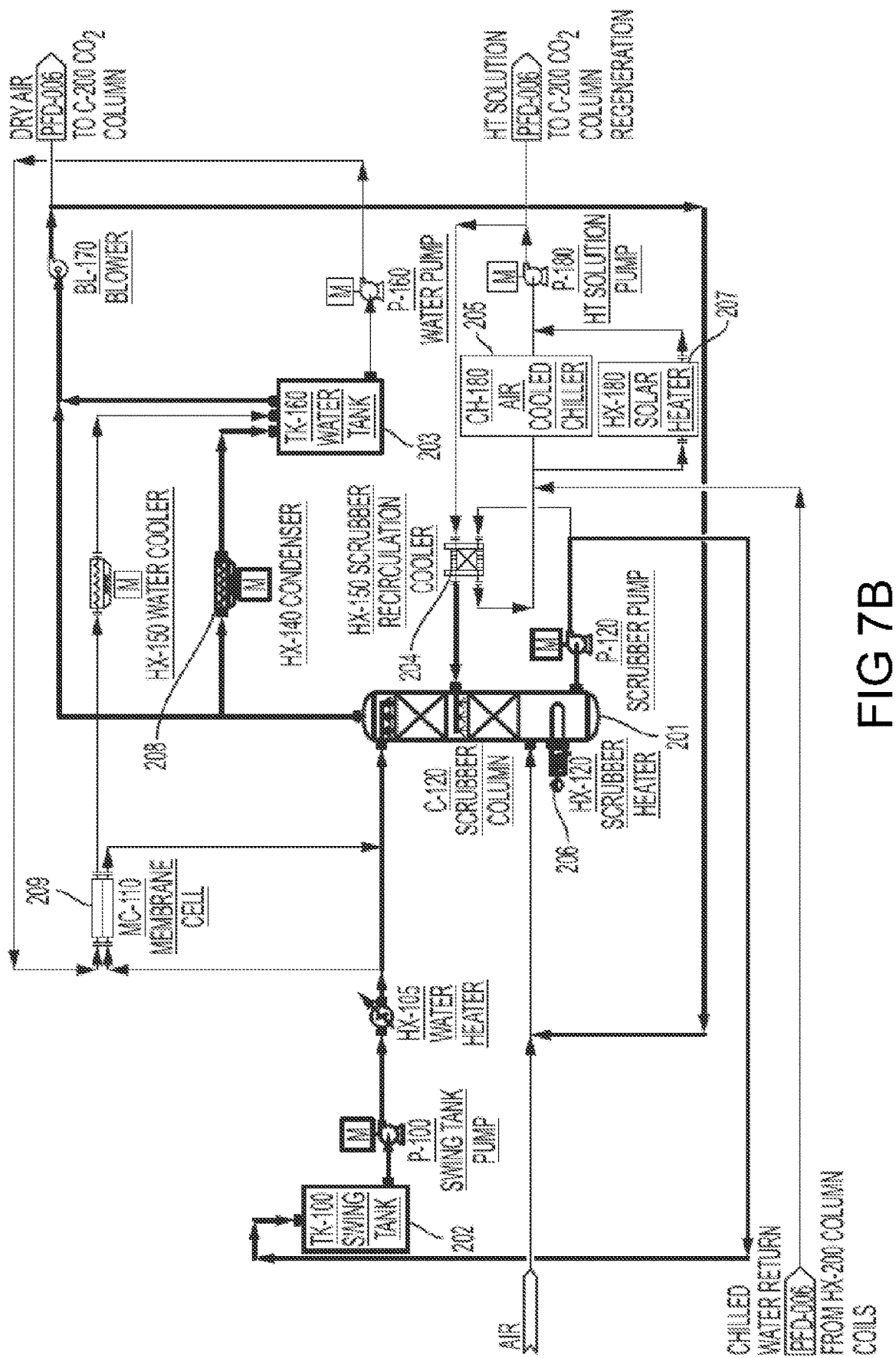

Moreover, certain embodiments may provide an analogous configuration on the desiccant side of the membrane by utilizing a heating fluid separated from the desiccant by a non-porous, heat-conductive film, as shown in FIG. 6E. In such an embodiment, the heating fluid (e.g., a heating oil, steam, a heated refrigerant, and/or the like) passes along a flow path through heating fluid flow 633f, on an opposite side of the non-porous film 633g from the desiccant fluid 633b. The heating fluid transfers heat to the desiccant flowing through desiccant flow 633b, which encourages water vapor transmission across the porous membrane 633a. Particularly when the heating fluid flow 633f configuration is incorporated together with the cooling fluid flow 633d configuration, a large difference in chemical potential is introduced between the desiccant flow 633b and the permeate flow 633c to encourage migration of water across the membrane 633a. As discussed above, the water vapor within the air gap may be directed out of the housing of the membrane-based water extraction device based on a vacuum created within the air gap, based on a sweep gas flowing through the air gap, and/or based on gravity that forces condensed water to flow downward and out through an outlet located at a bottom end of the air gap. In certain embodiments, the housing defines three outlets: a desiccant outlet (to flow path 634), a permeate outlet (to flow path 651), a heating fluid outlet (e.g., to recirculate the heating fluid along a heating fluid flow path) and a cooling fluid outlet (to recirculate cooling fluid along a cooling fluid flow path). In certain embodiments, the housing defines at least three inlets (when an inlet is not required for the permeate fluid, such as when gravity is utilized to direct the permeate fluid to exit the air gap) comprising a desiccant inlet (from flow path 632), a heating fluid inlet, and a cooling fluid inlet (e.g., from flow path 650). In other embodiments, the housing defines at least four inlets (when a permeate flow inlet is required, such as when utilizing a vacuum pressure or a sweep gas to direct the permeate out of the housing), comprising a desiccant fluid inlet (from flow path 632), a permeate fluid inlet (e.g., to enable a gas flow through the permeate side 633c of the membrane), a heating fluid inlet, and a cooling fluid inlet (e.g., from flow path 650).

By separating the permeate flow 633c from the cooling fluid 633d as illustrated in either of FIGS. 6D-6E, the efficiency of permeation of water through the membrane may be increased due to a low vapor-pressure on the permeate side 633c of the membrane. A vacuum pressure, a sweep gas, and/or other flow-encouraging mechanisms may be implemented within the permeate flow 633c to encourage the water vapor on the permeate side 633c of the membrane to exit through the permeate outlet of the membrane-based water extraction device 633 and to be guided to one or more compressors (to incorporate beneficial features of mechanical vapor compression, similar to that described in co-pending U.S. patent application Ser. No. 17/552,173, filed on Dec. 15, 2021, the contents of which are incorporated herein by reference in their entirety). The water vapor exiting the permeate outlet of the membrane-based water extraction device may flow to one or more heat exchangers and/or one or more condensers 627 to condense the water vapor into liquid water before storing the same within storage tank 655.

Other embodiments implement direct contact membrane distillation (DCMD) processes to drive chemical potential across the membrane 633a. In a DCMD configuration, the permeate water side 633c of the membrane 633a carries a cooling fluid (e.g., cooling water) that directly contacts the porous membrane 633a. In such a configuration, water is directed from the storage tank 655 directly to the permeate flow 633c so as to maintain a low temperature on the permeate side 633c of the membrane 633a. Because the cooling fluid is at a lower temperature than the desiccant fluid, the cooling fluid creates a temperature gradient across the membrane 633a, starting from the heated desiccant side 633b and finishing at the direct contacting cooling fluid on the permeate side 633c of the membrane 633a. The cooling fluid may be retrieved from the storage tank 655 and directed into the membrane-based water extraction device 633 along flow paths 658 to 650 to 633c (and out of the membrane-based water extraction device at flow path 651). In certain embodiments, a portion of the water exiting the storage tank 655 along flow path 658 may be directed to external systems for use as liquid water. The permeate side 633c of the membrane 633a is fed by cooling fluid (e.g., liquid water from storage tank 655), which causes water vapors that have permeated through the membrane 633a to condense and transfer the water vapors separated from the concentrated desiccant. A higher temperature gradient (a greater difference between the heated desiccant fluid and the cooling fluid) creates a greater driving force to separate water molecules within the concentrated desiccant across the porous membrane, thus achieving greater separation performance for the membrane-based water extraction device.

As yet another example, a sweep gas membrane distillation (SGMD) process may be utilized to create a chemical across the membrane 633a. SGMD configurations may be combined with AGMD and/or DCMD to drive further efficiency of such configurations. According to an SGMD configuration, the permeate water side 633c of the membrane 633a carries a sweep gas (e.g., nitrogen gas, high-humidity air, inert gas, and/or the like) that transports permeated fluid (e.g., water vapor) away from the porous membrane 633a after it has permeated through the porous membrane. In certain embodiments, the sweep gas may carry the permeated water vapor to a compressor 652 and/or a condenser 627, where the water vapor condenses into liquid water. The sweep gas may be separated from the permeated water vapors by bringing the mixture to the water dew point and ultimately the sweep gas may be directed away from the liquid water along flow path 659, leading out of the storage tank 655. The sweep gas may be directed back to a storage tank, and it may be recycled into the system along flow path 660 as discussed above. Condensing the permeated water vapor into liquid enables the water to be stored in the product water tank 655. In certain embodiments, the SGMD configuration utilizes an inert gaseous state fluid as a sweep gas that does not contaminate the product water. In certain embodiments of SGMD, the flow of gas into the permeate flow path 633c is heated to retain the physical state of the permeated water (vapor state). To aid in maintaining the vapor state, heat tracing elements can be utilized to prevent the fluid pipe walls from cooling the fluid to liquid state. The water vapor may then be transported to a condenser 627 downstream from the membrane-based water extraction device 633 to condense the water, which is then stored within the water storage tank 655. Moreover, in the SGMD embodiments, the sweep gas may be introduced along flow path 660 and 650 into the membrane-based water extraction device. The sweep gas may be directed away from the liquid water after condensation by directing the sweep gas out of the water storage tank, such as along flow path 659 as shown in FIG. 4B.

In certain embodiments, the water extraction module comprises one or more heating mechanisms along a flow path leading the desiccant fluid into the intake of the membrane-based water extraction device (on the desiccant side 633b of the membrane 633a). In one example embodiment, the desiccant fluid is heated to a temperature between about 40-80° C. The process may result in adequate separation even at low temperatures (approximately 40° C.). In certain embodiments, the efficiency of separation may be increased at higher temperatures (e.g., between about 60-80° C.).

For example, diluted desiccant leaving the absorber module passes through one or more heating subsystems between the absorber module and the membrane-based water extraction device. These heating subsystems are provided as a part of the water extraction module. The one or more heating subsystems may comprise one or more of: a condenser 627, a pre-extraction heat exchanger 629, and/or a heater 631. It should be understood that the one or more heating subsystems may be provided in any order relative to the flow of desiccant. In one example, the diluted desiccant, which remains cool after passing through the absorber 610, passes through a condenser 627 which utilizes the generally cool temperature of the dilute desiccant to encourage condensation of water vapor from water vapor flowing along the permeate water flow path 651-654 (e.g., the water flow path encompassing the water flow path on the second side of the porous membrane). In certain embodiments, the condenser 627 is a shell-and-tube heat exchanger, with the dilute desiccant (upstream of the membrane-based water extraction device 633) passing through the tubes, and the water vapor condensing on the exterior of the tubes within the shell of the heat exchanger. In another embodiment, the condenser 627 is a plate-and-frame heat exchanger, with the dilute desiccant fluid passing through one set of plates and the water vapor passing through the other set of plates, and the water vapor condenses in the heat exchanger as it traverses through the heat exchanger as it warms the dilute desiccant. In another embodiment, the condenser 627 is a double-pipe heat exchanger where the dilute desiccant passes through the inner pipe and the water vapor passes through the outer pipe such that it can condense on the exterior surface of the inner pipe. In certain embodiments the condenser 627 may have a counter-flow configuration (the dilute desiccant flowing in an opposite direction than the water vapor). In other embodiments, the condenser 627 may have a parallel, co-current flow configuration in which the dilute desiccant and the water vapor flow in the same direction through the condenser 627.

The dilute desiccant exiting the condenser 627 via the flow path represented at 628 has an increased temperature due to a certain amount of heat transfer that is transferred from the water vapor to the dilute desiccant within the condenser 627. The dilute desiccant then passes through a pre-evaporator heat exchanger 629 (e.g., a shell-and-tube heat exchanger, a plate-and-frame heat exchanger, a dual-tube heat exchanger (with concentric tubes), and/or the like) and/or heater 631 (e.g., an externally powered heater, such as an electric heater, a natural gas heater, a solar heater and/or the like) to increase the temperature of the dilute desiccant to or near the evaporation temperature. In certain embodiments, the heater may be an inline electric heater with heating element bundles for heating the dilute desiccant fluid. The heater may have an orientation to reduce the likelihood of fluid flashing on the elements. The heater 631 may be positioned within the housing of the membrane-based water extraction device. In certain embodiments, the heater is a heat exchanger (e.g., a shell-and-tube heat exchanger, a plate-and-frame heat exchanger, and/or the like). In certain embodiments, the heater 631 is a solar heater utilizing photovoltaic panels to generate electrical energy to drive electrical heater elements (e.g., resistive heater elements). In certain embodiments, the heater 631 is a frenal lens heater utilizing solar energy to generate thermal energy in the form of heat. In certain embodiments, the heater 631 comprises a geothermal heater mechanism comprising a series of pipes extending into the ground to utilize geothermal energy to heat the dilute desiccant fluid. In other embodiments, the heater 631 is a fired heater utilizing a hydrocarbon fuel source (e.g., natural gas, oil, wood, biomass, and/or the like) combined with oxygen (supplied from ambient air) to create heat from combustion.

In embodiments comprising both a pre-extraction heat exchanger 629 and heater 631, the dilute desiccant fluid first exits the pre-extraction heat exchanger 629 via flow path represented at 630 before entering the heater 631. Moreover, as discussed in greater detail herein, the opposite side of the pre-extraction heat exchanger 629 is provided with heated rich desiccant fluid exiting the membrane-based water extraction device.

As the desiccant flows out of the heater 631 (if used), it flows along a flow path 632 into the housing, specifically into the desiccant inlet of the membrane-based water extraction device. In the membrane-based water extraction device, the desiccant solution is brought into direct contact with the membrane. Utilizing the difference in temperature, pressure, and/or concentration, the water migrates though the membrane and is collected on the second side. The water may migrate through the membrane as a liquid and/or as a vapor. The water may then be distributed for use and/or collected in a storage tank 655. In certain embodiments, the vapor on the liquid water side of the membrane may be collected in cool liquid water or another cool fluid to condense the vapor. The vapor on the liquid water side of the membrane may be swept away from the membrane using a sweep gas that flows through the membrane-based water extraction device on the liquid water side of the membrane. The vapor may then be condensed in a further process using a heat transfer process such as a heat exchanger or other embodiment of heat transfer process to condense the water vapor into liquid water (the opposite side of the heater exchanger and/or condenser may define a portion of a flow path of a chilled fluid, such as the dilute desiccant prior to entry into the desiccant side of the membrane-based water extraction device). In certain embodiments the vapor directly enters a heat transfer process on the permeate side of the membrane after exiting the membrane-based extraction device 633. The heat transfer process may be a heat exchanger 629 or other embodiment of heat transfer process to condense the water vapor into liquid water. In other embodiments, a vacuum may be induced on the permeate side of the membrane to achieve a difference in pressure between the desiccant side and permeate side of the membrane. The water enters the membrane as a liquid and/or vapor and exits the membrane on the permeate side as a vapor. The water flow path leads the water into a storage tank 655 (via flow paths 651-654, inclusive of pump(s), heat exchanger(s) 627, compressor(s) 652, and/or other flow-assisting devices. The water flow path also circulates from the storage tank via flow path 650 (inclusive of one or more pumps in certain embodiments, not shown) to the membrane-based water extraction device 633. In certain embodiments, a sweep gas (e.g., humid air) is blown through the water flow path (e.g., via a blower in-line with the water flow path) to push water vapor out of the membrane-based extraction device 633 into the compressor 652 and ultimately into the condenser 627.

In certain embodiments, the vapor on the permeate side is compressed through mechanical and/or thermal means to a higher pressure (e.g., via compressor 652). The vapor is then passed through a heat exchanger 627 to allow the latent heat to be used to heat the desiccant solution. Through this heat exchanger the vapor is also condensed as a liquid.

The membrane-based water extraction device 633 may be configured for batch operation, wherein the desiccant circulates within a closed loop to repeatedly contact the desiccant fluid with the membrane (without directing the desiccant to the absorption module) until a desired quantity of water has been separated. Valves within the water extraction module may be configured to provide the closed-loop flow of the desiccant solution. After the concentration of the desiccant solution reaches a desired level, the desiccant solution is then sent back to the absorption module by reconfiguring the valves to enable flow of desiccant from the water extraction module to the absorption module. The membrane-based water extraction device 633 may encompass a system of parallel subunits where multiple membranes are held in a single apparatus and/or multiple membrane-based water extraction devices are operated in parallel (with each device operating to separate water from a portion of the desiccant solution). In certain embodiments the membrane separation subunits may also be configured in a series configuration. In this configuration the desiccant solution is contacted with the first membrane and a certain amount of water migrates through the first membrane. The retentate desiccant solution from the first membrane is fed to a second membrane as the desiccant solution where an additional quantity of water is separated from the desiccant solution. The process is repeated for the number of membrane separation subunits in the series setup. In certain embodiments a combination of the parallel and series units may be utilized.

In certain embodiments the membrane-based water extraction device 633 is configured for continuous operation where a stream of desiccant is flowed in direct contact (e.g., perpendicular, parallel or tangential to the membrane face) with the membrane, and water is continuously separated from the desiccant solution via the membrane. The continuous mode operation may utilize series and/or parallel subunits as described in the section above. During continuous operation, the desiccant flows in a continuous loop from the absorption module to the water extraction module and back to the absorption module.

In certain embodiments, the membrane-based water extraction device may be provided in combination with an evaporation-based water extraction device (e.g., an evaporation vessel for evaporating water from the desiccant, and a condenser for condensing the evaporated water into potable liquid water). For example, the membrane-based water extraction device may be provided upstream (along the desiccant flow path) from an evaporation vessel such as an evaporation vessel as described in co-pending U.S. patent application Ser. No. 17/552,173, filed Dec. 15, 2021, the contents of which are incorporated herein by reference in their entirety. The membrane-based water extraction device may alternatively (or additionally) be positioned downstream (along the desiccant flow path) of an evaporation vessel as discussed above.

Carbon Dioxide Capture

Processed air (which may comprise air exiting a water consolidation system as discussed herein) may be passed through a carbon dioxide capture system prior to exhaustion to the atmosphere. The carbon dioxide may be captured from the air for filtration and/or disposal (e.g., through one or more chemical processes to convert the carbon dioxide into water, oxygen, and/or a solid or liquid composition that may be disposed of; through capture of the carbon dioxide in a filtration media; and/or the like).

Figure 3:
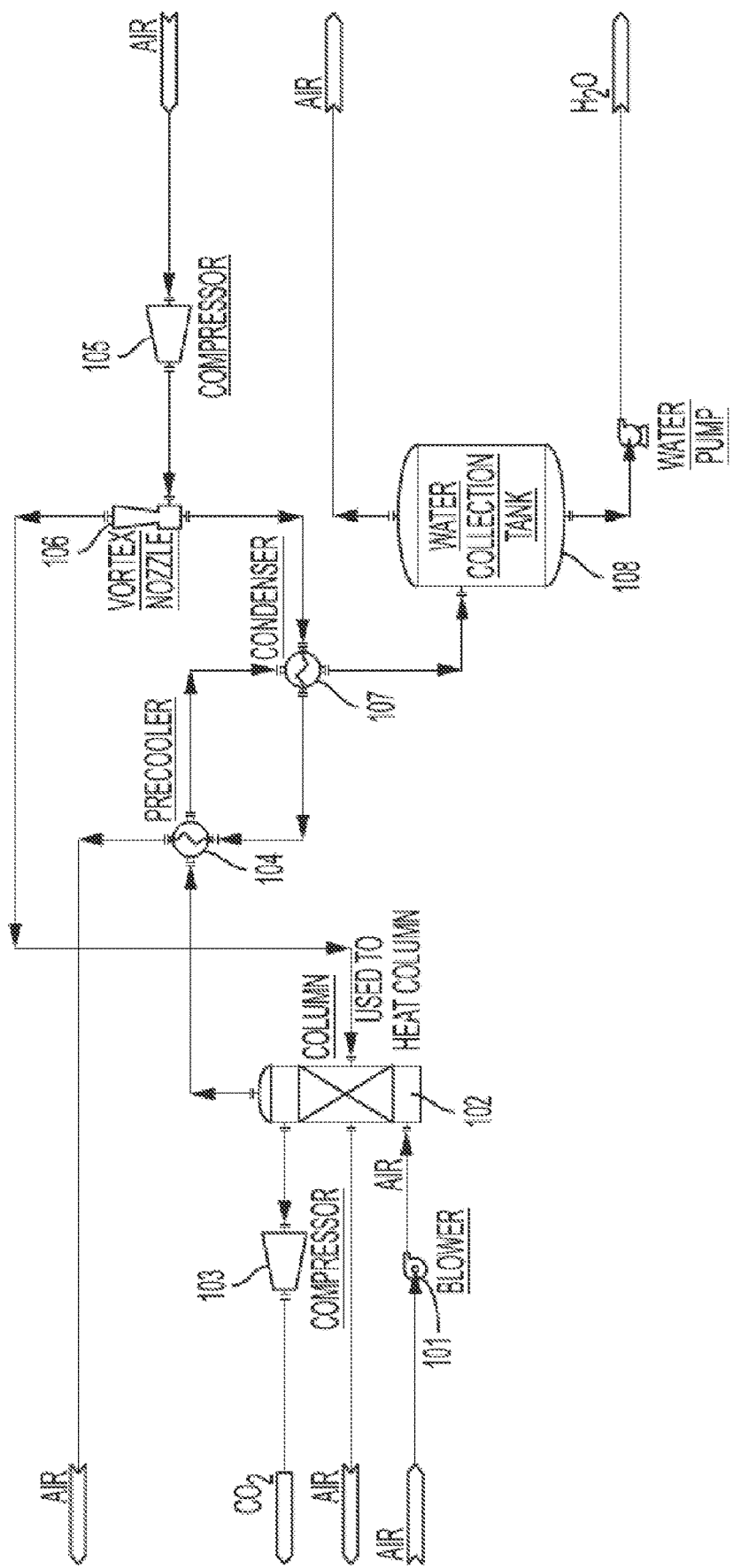
FIG. 3 shows a schematic diagram of an air preconditioning system and condenser according to one embodiment.

The carbon dioxide capture system may comprise a carbon dioxide capture column 102 having a fixed bed of a carbon dioxide absorbing material (e.g., a sodium hydroxide solution). As air is passed over the carbon dioxide absorbing material, the carbon dioxide is absorbed by the material. Moreover, as shown in FIG. 3, the carbon dioxide capture column 102 may be heated (e.g., with a hot fluid jacket) to facilitate increased carbon dioxide absorption by the absorbing material.

As yet other examples, the carbon dioxide capture material may be configured to reversibly absorb the carbon dioxide, such that the captured carbon dioxide may be compressed and stored as a gas for later use.

In certain embodiments, captured carbon dioxide gas may be directed to a greenhouse to optimize the internal greenhouse environment for plant growth. As discussed herein, the greenhouse may be supplied by water generated by the AWG system discussed herein.

Water Excitation System

In certain embodiments, the AWG system may comprise a fluid excitation system for exciting molecules of a liquid desiccant solution embodied as a hygroscopic feed solution to encourage evaporation of water absorbed in the liquid desiccant while minimizing any resulting mass transfer of the liquid desiccant itself into a water collection system (FIG. 4A, 668). The fluid excitation system may be utilized together with an evaporation column, together with a membrane separation system as discussed herein, or alone to remove water from the liquid desiccant. The fluid excitation system of an example embodiment comprises a unit configured to raise the energy level of the liquid desiccant to enable (or to facilitate) the separation of the liquid desiccant from water. As shown in FIG. 4A, the fluid excitation system 668 may be positioned upstream of a water extraction system (e.g., membrane-based system 633). As shown, the fluid excitation system 668 is upstream of one or more heat-transfer devices for further increasing the temperature of diluted desiccant, prior to providing the diluted desiccant into the separation system. However, it should be understood that the fluid excitation system 668 may be provided immediately upstream of a utilized water separation unit (such that the fluid excitation system 668 may be downstream of any other heating mechanisms utilized). The fluid excitation system facilitates the separation of clean water from concentrated liquid desiccant. In certain embodiments, the fluid excitation system comprises an energy-application system, pumps, valves, compressors, and/or piping as necessary to maintain a necessary flow of liquid desiccant into and out of the fluid excitation system, a necessary flow of water (and/or water vapor) into and out of the fluid excitation system, and/or the like.

To achieve separation of water from the liquid desiccant, excitation of water molecules absorbed into the liquid desiccant is used. In certain embodiments, excitation can be achieved by applying ultrasonic waves to the liquid desiccant. In this embodiment, ultrasonic waves are generated by an ultrasonic wave generator to excite the water molecules to a heightened energy state, wherein the water molecules attain higher enthalpy and entropy corresponding to a heightened temperature. Given sufficient excitation, the water molecules transition from the liquid state within the liquid desiccant to the vapor state. In certain embodiments, the ultrasonic waves may be applied as pulses, and the frequency and amplitude of the ultrasonic wave pulses may be tuned to allow for optimal excitation based on the composition of the liquid desiccant. In embodiments described herein, optimal excitation refers to excitation of the liquid desiccant to facilitate the extraction of water, such as by evaporating the water contained in the dilute liquid desiccant.

As another example, applying microwaves to liquid desiccant facilitates the excitation of the water molecules within the liquid. In this embodiment, microwaves generated by a microwave generator excite the water molecules to a higher energy state, wherein the water molecules attain higher enthalpy and entropy corresponding to a heightened temperature, causing the molecules to transition from the liquid phase to the vapor phase, thereby allowing for separation of water from the liquid desiccant. In certain embodiments excitation may be induced by an electromagnetic field generator. In this embodiment, an electromagnetic field generator is used to excite the water molecules into the vapor state allowing for separation of water from the liquid desiccant. In the above embodiments, the excitation can be tuned to allow for optimal separation of water from the liquid desiccant.

In certain embodiments the energy-application system unit does not fully vaporize water molecules in the liquid desiccant and is paired with electrodialysis, mechanical vapor compression, membrane distillation, vacuum membrane distillation, single effect distillation, distillation, and/or another form of liquid desiccant regeneration to extract additional water from the liquid desiccant. In certain embodiments the energy-application system may assist other forms of molecule excitation which utilize pressure changes induced by vacuum or high pressure and/or thermal changes.

The energy-application system may comprise a vessel 3 (FIG. 1) for receiving the liquid desiccant from the atmospheric water collection component. In some embodiments, the energy-application system excites the water molecules within the liquid desiccant positioned within the vessel, until the water molecules are vaporized. The water vapor is withdrawn from the system and condensed as discussed herein (e.g., via a condenser and/or a heat exchanger). The condensed liquid desiccant exits the vessel and is provided to the absorber system to be utilized for collection of additional water.

In certain embodiments, particles and/or chemical components may be added to the liquid desiccant to enhance excitation characteristics of the liquid desiccant, such as to raise the liquid desiccant temperature within the system to a desired level. Non-limiting examples of particles that may be added encompass conducting additives such as carbon containing nanomaterials, boron nitride nanomaterials and/or other nanoparticles. Such particles may facilitate heat and mass transfer within the fluid, as these particles are responsive to the heat generated by ultrasonic waves, thereby assisting in increasing the energy of the fluid.

In certain embodiments, the energy-application system is run at least substantially continuously, in a steady-state configuration. In other embodiments, the energy-application system is run in a batch configuration, such that liquid desiccant enters the system (e.g., a vessel) and is excited in the vessel by the energy-application system, such as until a defined quantity of water is extracted from the vessel. The resulting concentrated liquid desiccant is then provided to the absorber to absorb additional water from atmospheric air.

In certain embodiments, a plurality of excitation systems is provided for operation in parallel. In such a configuration, water is collected from all of the excitation units and provided to a common collection tank. The concentrated liquid desiccant is collected within a common manifold and provided to the absorber.

In certain embodiments, a plurality of excitation systems operates in series. In a series configuration, water from the first excitation system can be utilized to heat the liquid desiccant provided as input to the second excitation system in the series (e.g., via a heat exchanger), or the water may be provided directly to a common water collection tank or a condenser. Liquid desiccant exits a first excitation system and may be passed through a heat exchanger heated by the water vapor from the first excitation system or may be directed directly to a second excitation system within the series of the plurality of excitation systems. The excitation systems of the plurality of excitation systems may utilize identical excitation technologies, or the excitation systems of the plurality of excitation systems may utilize different excitation technologies. Once the liquid desiccant reaches a defined concentration level, it may be provided from the last excitation system in the series of excitation systems to the absorber to absorb additional water from atmospheric air.

An example system may be configured for producing at least approximately 180 gallons of water per day based on an ambient air temperature of 95° F. and an ambient relative humidity level of 30%. Ambient air may be provided to the absorption column at a flow rate of at least approximately 2800 cubic feet/minute to pass through a packed column directing a rich lithium chloride solution having a concentration of between about 38-45 wt % (e.g., about 40 wt %). Water may be absorbed by the lithium chloride solution and the concentration of the lithium chloride solution may fall to a lean concentration level of about 38-40 wt % (e.g., about 38.6 wt %) before the desiccant solution is directed out of the absorption column. During the absorption process, the absorption column may be maintained at a temperature of at least approximately 80-90 degrees Fahrenheit.

The desiccant solution provided within embodiments discussed herein may be embodied as a chemical compound having hygroscopic characteristics. In certain embodiments, the desiccant solution may be a fluid, a gel, and/or the like within the typical operating temperature ranges discussed herein. As non-limiting examples, the desiccant solution may be embodied as lithium-chloride (LiCl), lithium-bromide (LiBr), calcium chloride ($CaCl_2$), triethylene glycol, and/or the like. Other, unlisted chemical compounds having hygroscopic characteristics may be provided for use as the desiccant solution in certain embodiments. The liquid desiccant may also be comprised of surfactants and/or nanofluids.

Water Extraction Devices

The water extraction unit comprises an apparatus containing the energy imparting module, associated pumps, valves, compressors, and piping. In certain embodiments, the energy imparting module comprises one or more non-thermal water excitation devices (e.g., connected in series or in parallel) and/or in combination with at least one heat-only system. In this embodiment, the excitation module is connected to the absorption module via various flow streams to enable desiccant to flow between the absorption module and the water extraction module. This fluid separation device comprises the apparatus that the desiccant media is subjected to heating until it reaches the saturation state to allow the separation of captured water from the hygroscopic desiccant. As a result, the concentration of dilute liquid desiccant is increased, thereby utilizing sensible heat transfer to heat the desiccant fluid to encourage water vapor migration. In certain embodiments, the concentrated liquid desiccant may be completely or in portion recycled to the absorption module within the AWG system. In this embodiment, the AWG water extraction module comprises at least one or more non-thermal heating systems including ultrasonic, microwave, and/or the combination thereof.

Ultrasonic Water Extraction Device

In certain embodiments, the water extraction device described herein comprises an excitation component shown in FIG. 1 positioned between an atmospheric water collection component and a water separation component such as in the AWG systems discussed herein, wherein the excitation component comprises a housing having an inlet 1 configured to receive a liquid desiccant from the atmospheric water collection component and an outlet 2 for the liquid desiccant to flow to the water separation system, wherein the liquid desiccant media 8 comprises a liquid desiccant; and one or more ultrasonic nozzles 7 positioned within the housing and configured to apply ultrasonic waves to liquid desiccant within the housing to excite water molecules within the liquid desiccant media 8.

In embodiments described herein, the separation system configured to separate water from the liquid desiccant via one or more of electrodialysis, mechanical vapor compression, or distillation, such as but not limited to, membrane distillation, vacuum membrane distillation, single effect distillation, or any combination thereof.

In embodiments described herein, the liquid desiccant is selected from the group consisting of $CaCl_2$, NaCl, LiCl, $MgCl_2$, KCOOH, $CH_3COOK$, colloids, nanomaterials, and ionic liquids, or a combination thereof.

In certain embodiments, the fluid retention chamber is cylindrical, cubical, conical, or a combination thereof. In embodiments, the device comprising one or more ultrasonic nozzles comprises at least two ultrasonic nozzles 7, and the device further comprises, at least two ultrasonic generators 6 and at least two ultrasonic transducers 5 each operating a corresponding one of the at least two ultrasonic nozzles. In embodiments described herein, the nozzles extend through at least one wall of the fluid retention chamber. In some embodiments, the nozzles extend through two or more walls of the fluid retention chamber. In embodiments described herein, the nozzles are positioned such that the range of the ultrasonic waves is maximized. In certain embodiments, the nozzles are spaced apart by 2 cm to up 10 cm. In embodiments, the one or more nozzles extend through the same wall of the retention chamber. In other embodiments, one or more nozzles extend through one or more walls of the fluid retention chamber. In embodiments described herein, the device comprises one ultrasonic nozzle, two ultrasonic nozzles, three ultrasonic nozzles, or up to six ultrasonic nozzles. In certain embodiments, the device comprises 2 ultrasonic nozzles, as shown in FIG. 1.

In embodiments described herein, the fluid retention chamber further comprises an outer wall 3. The outer walls of the chamber comprise plastic or metal or any material that facilitates the containment and heating of the liquid desiccant. The inside walls of the fluid retention chamber can be coated, or otherwise modified, with insulating material 4 such that there is limited loss of heat generated by the ultrasonic waves. The device can further comprise a sound enclosure device to reduce any discomfort for the user from the loud noise generated by the ultrasonic waves.

Microwave Water Extraction Device

Figure 2:
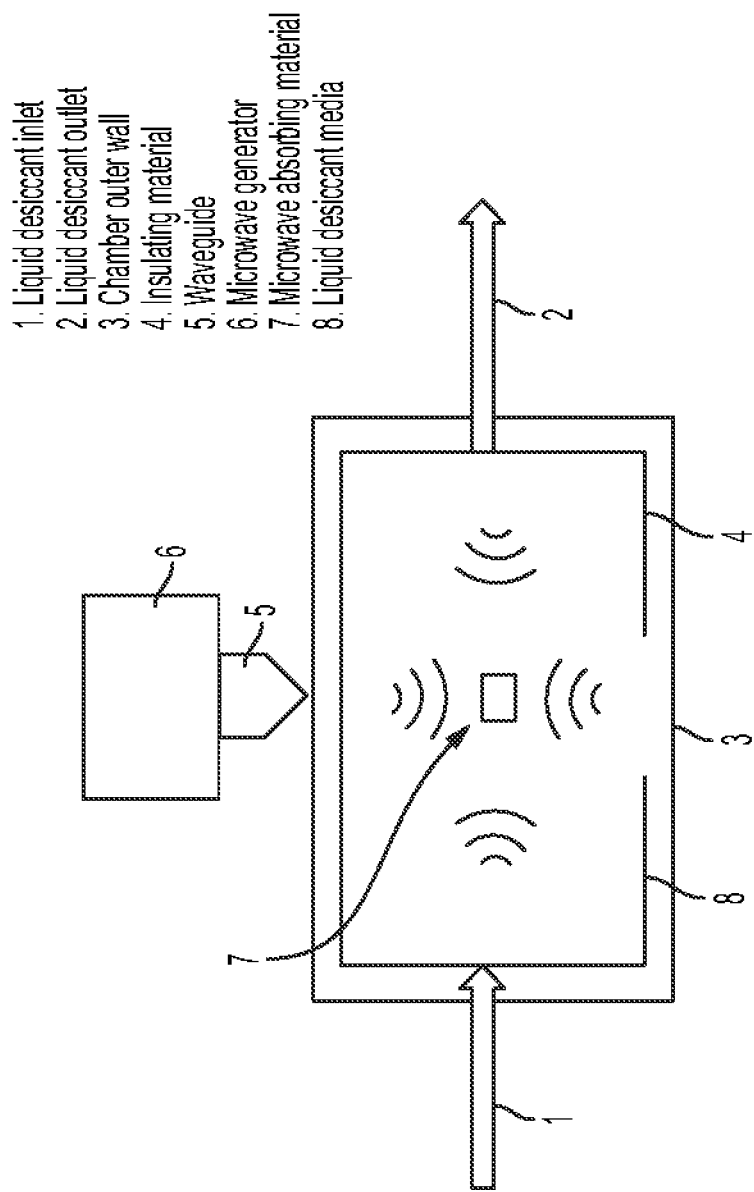
FIG. 2 shows a schematic diagram of a microwave water excitation system according to one embodiment.

In certain embodiments, the water extraction device described herein comprises an excitation component shown in FIG. 2 positioned between an atmospheric water collection component and a water separation component, wherein the excitation component comprises a housing having an inlet 1 configured to receive a liquid desiccant from the atmospheric water collection component and an outlet 2 for the liquid desiccant to flow to the water separation system, wherein the liquid desiccant media 8 comprises a liquid desiccant; and one or more microwave generators 6 and waveguides 5 positioned within the housing and configured to apply microwaves to liquid desiccant within the housing to excite water molecules within the liquid desiccant.

In embodiments described herein, the separation system configured to separate water from the liquid desiccant via one or more of electrodialysis, mechanical vapor compression, or distillation, such as but not limited to, membrane distillation, vacuum membrane distillation, single effect distillation, or any combination thereof.

In embodiments described herein, the liquid desiccant is selected from the group consisting of $CaCl_2$, NaCl, LiCl, $MgCl_2$, KCOOH, $CH_3COOK$, colloids, nanomaterials, and ionic liquids, or a combination thereof.

In certain embodiments, the fluid retention chamber is cylindrical, cubical, conical, or a combination thereof. In embodiments, the device comprises one or more microwave generators 6 each operating a corresponding waveguide, comprises one or more microwave waveguides 5, and the device further comprises, one or more microwave absorbing materials which convert the electromagnetic waves into thermal energy. In embodiments described herein, the waveguides are applied to least one wall of the fluid retention chamber. In some embodiments, the waveguides are applied to two or more walls of the fluid retention chamber. In embodiments described herein, the waveguides are positioned such that the range of the microwaves is maximized. In certain embodiments, the waveguides are spaced apart by 2 cm to up 10 cm. In embodiments, the two or more waveguides are applied to the same wall of the retention chamber. In other embodiments, two or more waveguides are applied to two or more walls of the fluid retention chamber. In embodiments described herein, the device comprises one microwave waveguide, two microwave waveguides, three microwave waveguides, or up to six microwave waveguides. In certain embodiments, the device comprises 1 microwave waveguide, as shown in FIG. 2.

In embodiments described herein, the fluid retention chamber further comprises an outer wall 3. The outer walls of the chamber comprise plastic or metal or any material that facilitates the containment and heating of the liquid desiccant. The inside walls of the fluid retention chamber can be coated, or otherwise modified, with insulating material 4 such that there is limited loss of heat generated by the microwaves.

Methods of Heating the Liquid Desiccant Media

Ultrasonic Heating System

To achieve separation of water from the liquid desiccant, ultrasonic-assisted extraction of water is used where the ultrasound wave propagates through a desiccant media by a series of compression and rarefaction cycles parallel to the direction of wave propagation. This creates an acoustic pressure in addition to the hydrostatic pressure. In this embodiment, ultrasonic waves are generated within the system using at least one ultrasonic wave transducer that is operatively connected with at least one ultrasonic generator. In certain embodiments, the power and frequency which are the most influencing parameters of ultrasonic waves are varied to allow for optimal sensible heating caused by the excitation of liquid desiccant molecules based on the composition of the liquid desiccant. In this embodiment, tuning of ultrasonic waves may comprise utilizing high power or low-frequency ultrasound (20-100 kHz) and/or medium power or intermediate frequency sound (100 kHz to 1 MHz) and/or low power and high-frequency sound (1-10 MHz). In this embodiment, the ultrasonic waves input may be varied based on a 'pulse on' or 'pulse off' mode. Pulse mode of the ultrasonic generator comprises rapidly turning the ultrasonic output of the generator on and off. Pulse mode facilitates the formation of more cavitation bubbles and the implosion of these cavitation bubbles, thereby, increasing the excitation of the water molecules in the liquid desiccant. In certain embodiments, the ultrasonic module comprising a plurality of ultrasonic nozzles (e.g., connected in series or in parallel), the ultrasonic nozzles are oriented and/or tilted in different directions relative to one another or spatially located at varying distances from the walls of ultrasonic chambers to improve the system performance. In certain embodiments, the ultrasonic module may comprise of sound enclosure device (insulating material) that reduces extremely loud noise to avoid discomfort to the user.

In certain embodiments, propagation of ultrasonic waves induces some hydrodynamic effects including, but not limited to, cavitation, microstreaming, mechanical oscillations, acoustic streaming, and/or the combination thereof. The cavitation bubbles occur when the ultrasonic wave passes through the liquid desiccant media residing in the ultrasonic module. Like any sound wave, the ultrasonic waves propagate in a series of compression and rarefaction cycles affecting the molecules of liquid desiccant. A cavitation bubble within the fluid is formed when the negative pressure of the rarefaction cycle exceeds the intermolecular attractive forces among the desiccant molecules. The cavitation bubble continues to grow on compression through the successive cycles until it totally collapses to form an acoustic effect. In this embodiment, at least one cavitation bubble reaches a critical size and then in the compression region implodes violently, which induces physical, chemical, and heat effects. As a result, this phenomenon caused by the ultrasonic waves is understood to generate extreme local temperature and pressure up to 5000 K and 1000 atm, respectively, thereby utilizing sensible heat transfer to heat the desiccant fluid to encourage water vapor migration. In certain embodiments, the heat transfer within the fluid is further enhanced by the turbulence occurring at micro- and/or macro-scale by the collapse of cavitation bubbles, formation of microjet, and shock waves. Another important hydrodynamic effect of ultrasonic propagation is acoustic streaming (Eckart streaming and Rayleigh streaming) with varied transducer position-dependent velocities from 0.01 to 1 m/s, thereby increasing turbulence through the medium for heat and mass transfer application. In certain embodiments, the height of the fluid media relative to the transducer position within the chamber may be varied for optimal sonication conditions.

Certain embodiments are directed to methods of water extraction comprising separating water from the liquid desiccant using the ultrasonic water extraction device described herein wherein the liquid desiccant flows into the excitation component from the atmospheric water collection component. The liquid desiccant in the excitation component is excited using ultrasonic waves in order to heat the solution and generate high humidity water vapor. The heated liquid desiccant flows out of the excitation component into the water separation system wherein the water is separated from the liquid desiccant. For example, the heated liquid desiccant may flow into a membrane separation system, as discussed herein.

In embodiments described herein, the method of water extraction can be carried out in a batch process or a continuous process. In certain embodiments, the liquid desiccant resides in the retention chamber for at least 30 minutes. In embodiments, the ultrasonic waves described herein are tuned such that sensible heating is achieved based on the composition of the liquid desiccant.

In embodiments described herein, the tuning of the ultrasonic waves comprises changing the frequency of the ultrasound waves. In embodiments described herein, the frequency of the ultrasound waves may be varied using a controller which can be operated manually or automatically. In some embodiments, the controller comprises a UI allowing the operator to vary the frequency of the ultrasound manually or automatically, remotely. In some embodiments, the ultrasonic waves are high-power, low-frequency waves comprising wave frequencies between 20 kHz to 100 kHz. In some embodiments, the ultrasonic waves are medium-power, intermediate frequency waves comprising wave frequencies between 100 kHz to 1 MHz. In other embodiments, the ultrasonic waves are low-power, high frequency waves comprising wave frequencies between 1 MHz to 10 MHz.

In embodiments described herein, the ultrasonic waves generate local temperatures of at least 500K, at least 1000K, at least 1500K, at least 3000K, or up to at least 5000K.

Microwave Heating System

In certain embodiments, microwave-assisted water extraction from liquid desiccant may be implemented, causing the water molecules in desiccant media to phase transition from liquid to vapor. Microwave-induced heating of desiccant media may comprise advantages including contactless heating, rapid heating, targeted heating, and independence from heat convection. In this embodiment, the microwave unit may operate based on a multimode or single-mode reactor configuration. In certain embodiments, the intensity of microwaves may be tuned to allow for optimal sensible heating when molecules absorb electromagnetic energy and convert it into heat. In certain embodiments, the electromagnetic radiation may be operated with a frequency of 2.45 GHz. In certain embodiments, the microwave excitation system may not fully vaporize water molecules in the liquid desiccant by itself and thereby may require integrating another separation module including, but not limited to, electrodialysis, mechanical vapor compression, membrane distillation, vacuum membrane distillation, single effect distillation, distillation, and/or another form of liquid desiccant regeneration. In certain embodiments, the excitation regeneration unit may assist other forms of molecule excitation which utilize pressure changes induced by vacuum or high pressure and/or thermal changes.

In embodiments described herein, the microwaves excite the water molecules to the point of vaporization. The extracted water flows out of the system into a water separation system where the water molecules in the liquid desiccant are separated. In some embodiments, the separation system comprises a condensation chamber as a part of the closed loop flow path to condense water from the elevated-humidity air of heated liquid desiccant to collect the water as a usable liquid within a water tank. In certain embodiments, the condensation chamber further comprises a heat exchanger configured to lower the temperature of the elevated-humidity air of the liquid desiccant exiting the excitation component to increase the rate of condensation. In embodiments described herein, the separation system additionally comprises a membrane desalination system in line with the desiccant closed loop flow path. In the membrane desalination system, the desiccant flow path may flow past a first side of a membrane, such that the desiccant solution contacts the membrane as it travels along the desiccant flow path. The membrane may separate the desiccant solution flow path from a water flow path for water collected from the condensation process described herein. The water flow path may pass a second side of the membrane such that the water contacts the second side of membrane as it flows along the water flow path. In certain embodiments, the mass transfer across the membrane may be driven by raising the vapor pressure of the desiccant. This may be accomplished by heating of the liquid prior to contact with the membrane or using a vacuum to reduce the pressure on the second side of the membrane or a combination of both. The water in the desiccant begins permeation of the membrane in the liquid state and exits the membrane in a vapor state. The water is then condensed utilizing a heat exchanger (e.g. condenser) and/or contacting it with a colder fluid (e.g. condensed water). The concentrated liquid desiccant that exits the separation system is recycled to the absorber system to allow for the collection of water vapor.

The microwave-induced heating weakens the hydrogen-bonding structure in the bulk liquid desiccant and enhances molecular mobility. During microwave heating, the electric conductivity of the materials plays a major role. In certain embodiments, the microwave absorbing particles and/or chemical components with varied conductivities may be added to the liquid desiccant to tune the excitation of the fluid to a desired state and or frequency. Examples of particles may be ferromagnetic materials and/or carbon nanomaterials and/or nanoparticles. The penetration depth as dictated by the permittivity of the material may be used to visualize the ability of a material to be heated by microwaves. In certain embodiments, microwave-induced heating may cause the formation of nanobubbles, where the thermal and nonthermal effect of microwave radiation generates superheated hot spots leading to the formation of gaseous and vapor bubbles at temperatures below the boiling point. Based on the material-specific absorption, microwave irradiation can cause strong local heating and hot-spot formation and sometimes can reach up to as high as 2000° C. within a few minutes with microwave exposure. In certain embodiments, the heating time by microwaves may be varied. In addition to the strong heating, microwave treatment of material-specific absorption may lead to the generation of intense light emission and outgassing, enabling localized super-heating effects for homogenous heat and mass transfer applications within the separation unit. In certain embodiments, the microwave chamber may be coated with a susceptor material and/or the introduction of stirrer to stir fluid media to increase the heating efficiency and to decrease problems due to heat dissipation. Such materials, in certain embodiments, may comprise conducting polymers and/or a metal layer and/or like some other heating additives. In certain embodiments, the microwave-heating module may comprise insulating material along the inner walls of a chamber to prevent the loss of microwave irradiation or to control the heat dissipation or the combination thereof.

In embodiments, described herein are methods of water extraction comprising separating water from the liquid desiccant using the microwave water extraction device described herein wherein the liquid desiccant flows into the excitation component from the atmospheric water collection component. Subsequently, the liquid desiccant in the excitation component is excited using microwaves in order to heat the solution and generate high humidity water vapor. The heated liquid desiccant flows out of the excitation component into the water separation system wherein the water is separated from the liquid desiccant.

In embodiments described herein, the method of water extraction can be carried out in a batch process or a continuous process. In certain embodiments, the liquid desiccant resides in the retention chamber for at least 30 minutes. In embodiments, the microwaves described herein are tuned such that sensible heating is achieved based on the composition of the liquid desiccant.

In embodiments described herein, the tuning of the microwaves comprises changing the frequency of the microwaves. In some embodiments, the microwaves generated for heating the liquid desiccant comprises microwave frequencies between 0.5 GHz up to 5 GHz. In embodiments described herein, the microwaves generated for heating the liquid desiccant are at frequencies between 1 GHz to 3 GHz. In certain embodiments, the microwaves are generated at a frequency of approximately 2.4 GHz.

In embodiments described herein, the microwaves generate local temperatures of at least 100° C., at least 500° C., at least 1000° C., at least 1500° C., or up to at least 2000° C.

Methods of Heating in Series or Batches

In certain embodiments, the excitation unit may be operated in a continuous configuration as described above. In certain embodiments, the excitation unit may be operated in a batch configuration where the liquid desiccant enters the system and is excited in the unit until a predetermined amount of water leaves the unit. The concentrated liquid desiccant is then sent to the absorber and more fluid enters the excitation unit. In certain embodiments, the excitation system runs units in parallel. In the parallel configuration, the water is collected from all units and sent to a common collection tank. The liquid desiccant is collected in a common manifold and sent back to the absorber. In certain embodiments, excitation units are run in series. In the series configuration water from the first unit can be used to heat the feed to the second unit with a heat exchanger or sent to the water collection tank or condenser. Liquid desiccant from the first excitation unit may run through a heat exchanger heated by the water vapor or may just enter the second excitation unit. The excitation units may comprise different types of excitation technology as described above. Once the liquid desiccant reaches a predetermined concentration, it is sent from the last excitation unit in the series to the absorber.

Automated Agricultural Usage

Figure 8A:
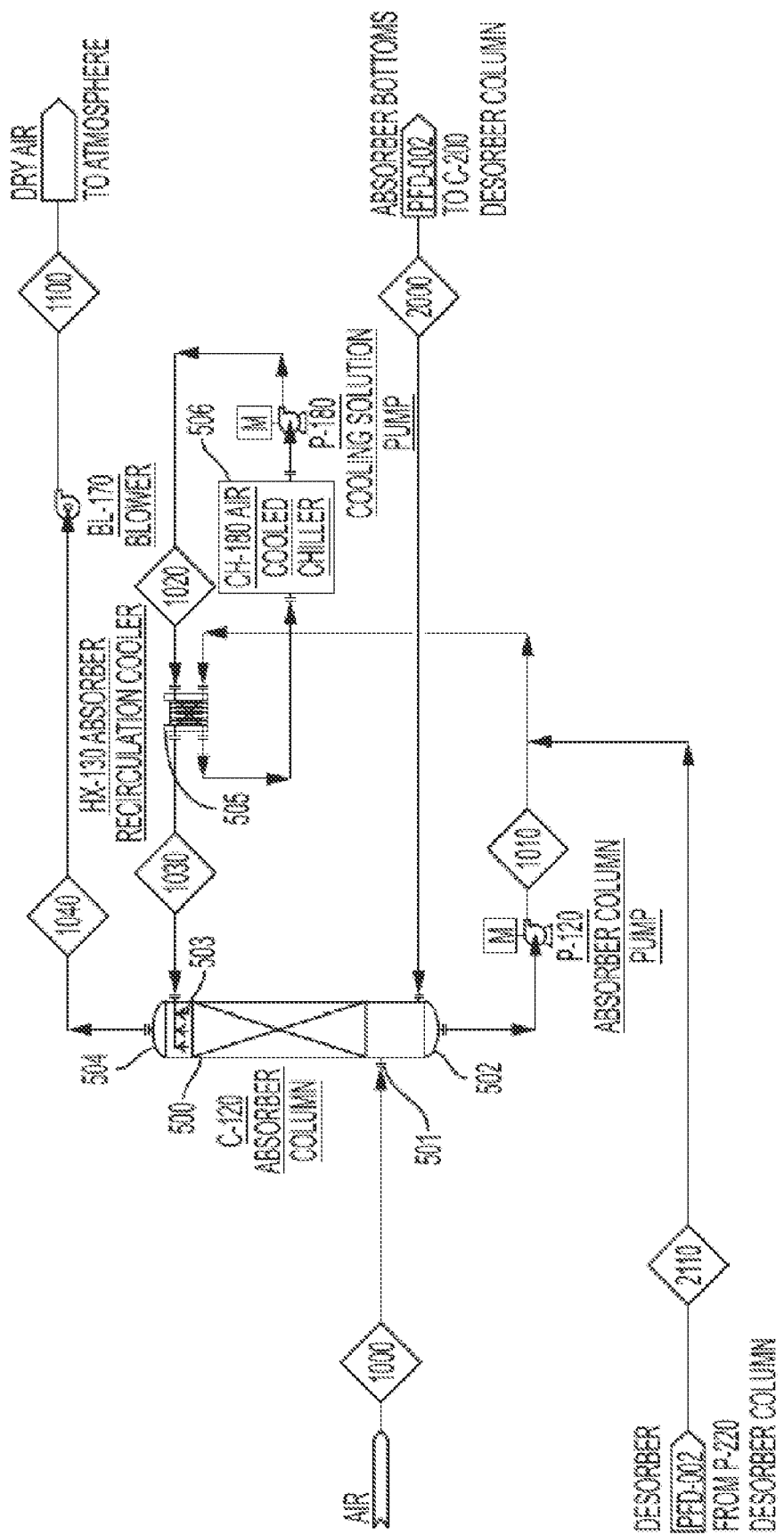
FIGS. 8A-8B show a schematic diagram of a continuous vapor consolidation system in line with a water vapor condensation system according to one embodiment.
Figure 8B:
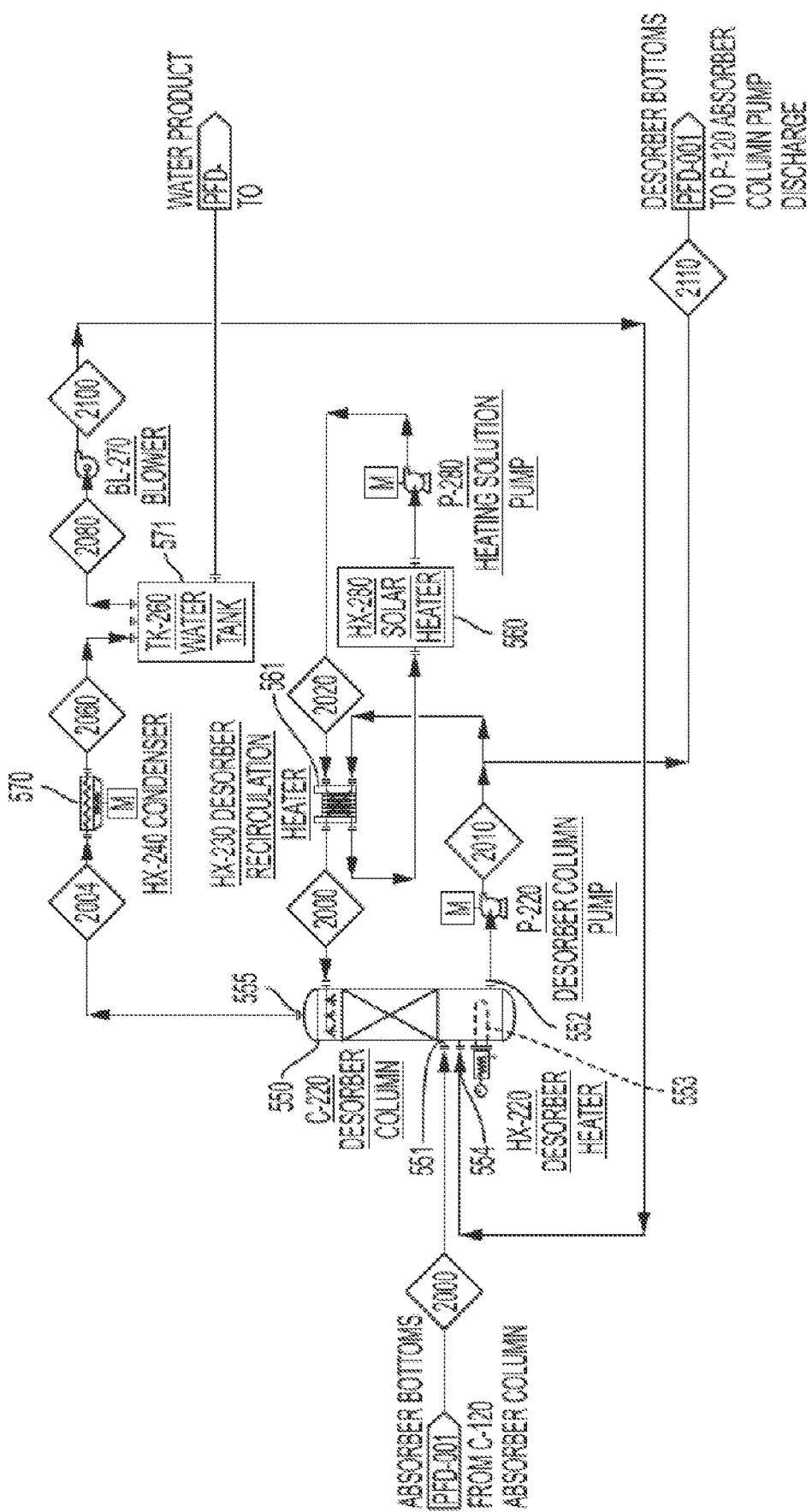
Figure 9:
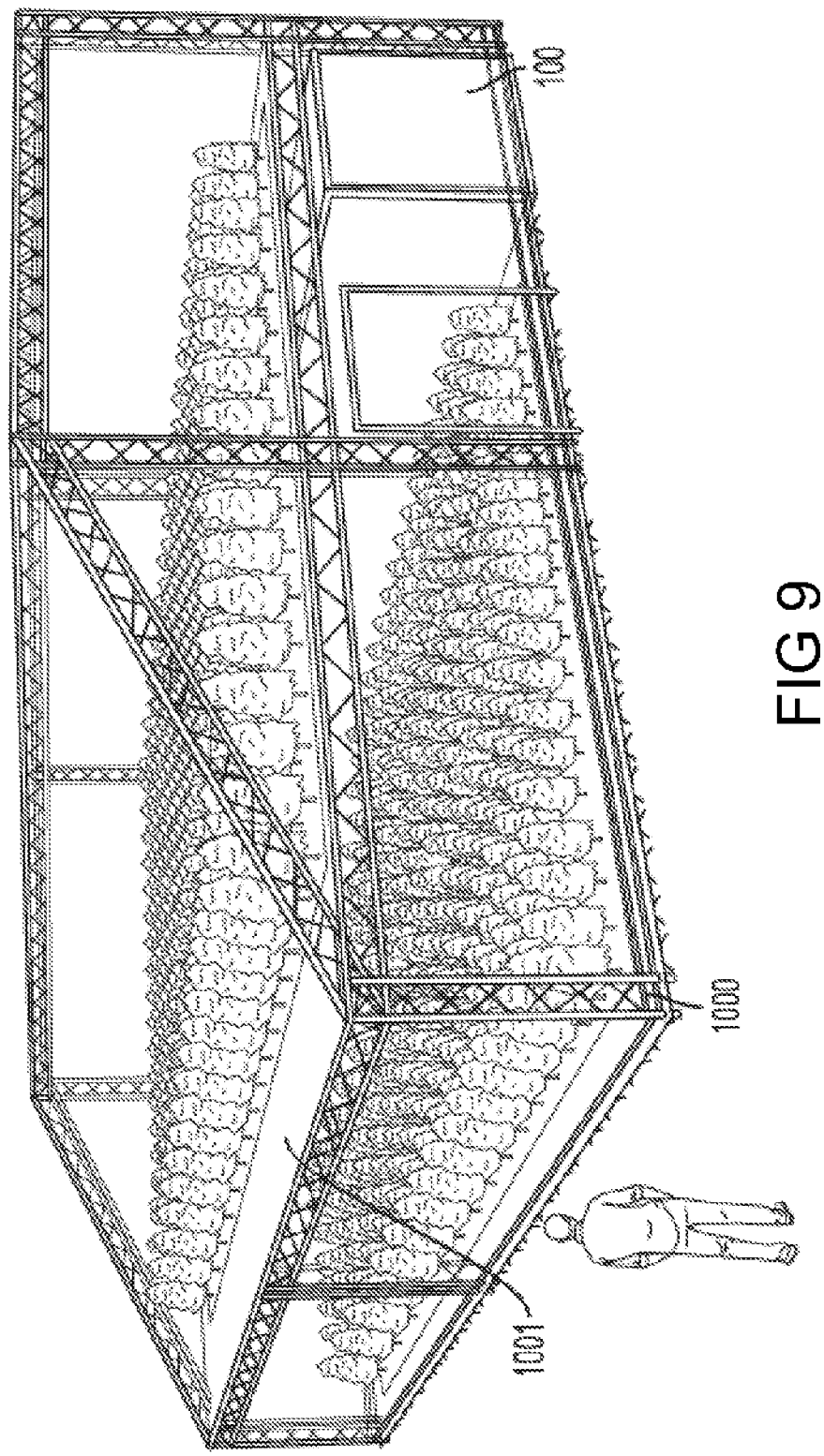
FIG. 9 is an example implementation of a vapor consolidation system with an agricultural module according to one embodiment.

The AWG system may be utilized to generate water and/or power to be supplied to an agricultural module, which may comprise a greenhouse, plant growth habitat, and/or other structure that may be utilized to encourage plant growth within controlled atmospheric conditions. FIGS. 8-9 illustrates various embodiments of an agricultural module 1000 in association with an AWG system 100 housed within a shipping container according to one embodiment. As shown in the figures, the agricultural module 1000 may define a plant growth habitat having an at least substantially rectangular shape, or a shape with a plurality of separate lobes (e.g., to form a star-shape, as shown in FIG. 9). In embodiments comprising separate lobes, the volume within each lobe may be separated from the remainder of the growth habitat, such that each lobe may be provided with a unique growth environment (e.g., different temperatures, carbon dioxide levels, humidity levels, and/or the like) to foster growth of different agricultural products.

Figure 10:
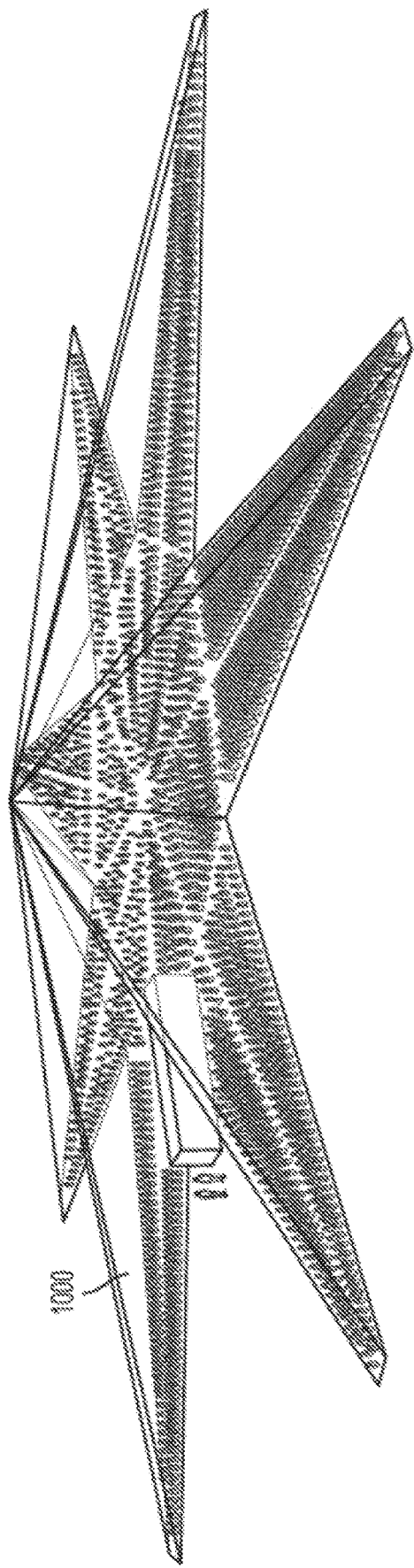
FIG. 10 is another example implementation of a vapor consolidation system with an agricultural module according to one embodiment.
Figure 11:
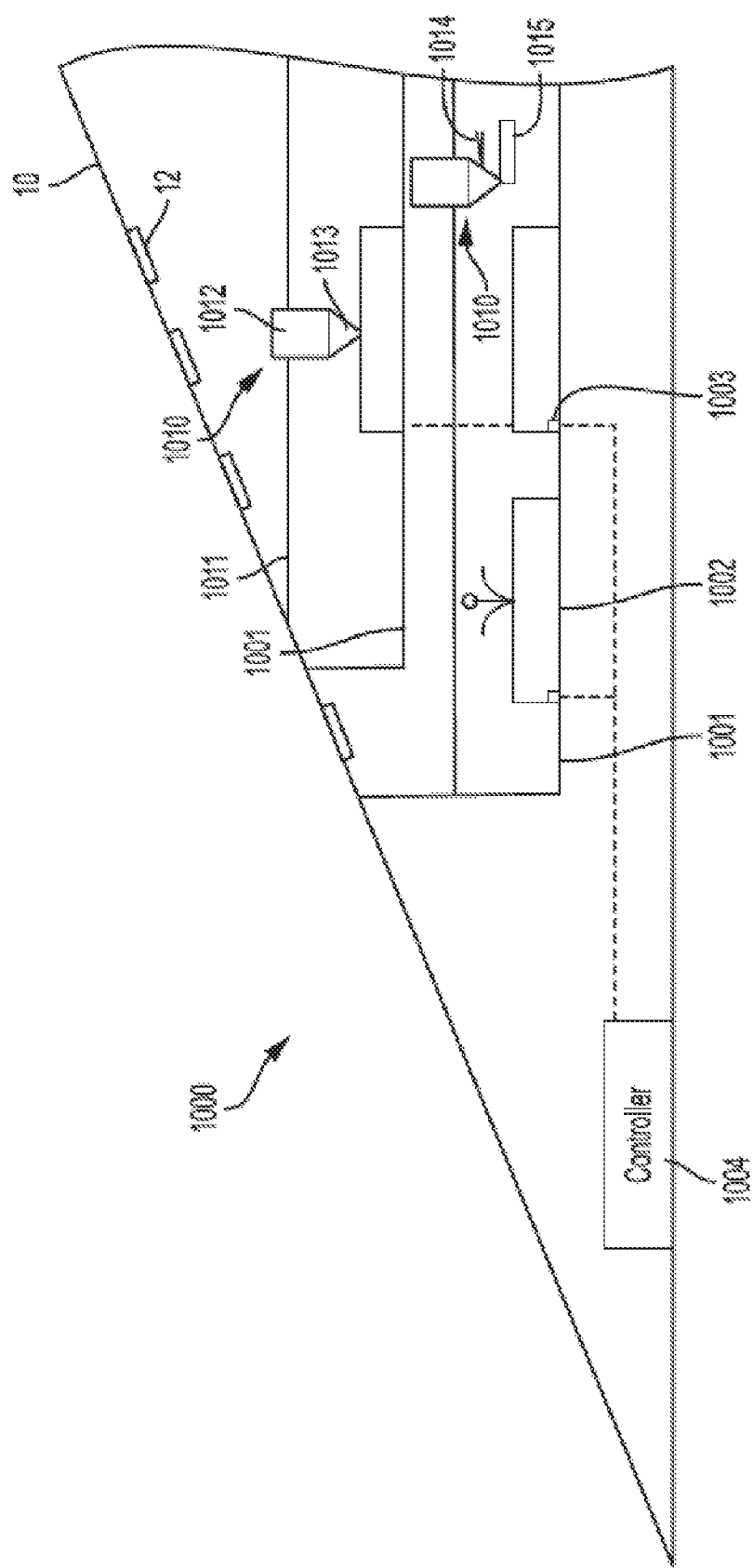
FIG. 11 illustrates an automated planting mechanism according to one embodiment.
Figure 12:
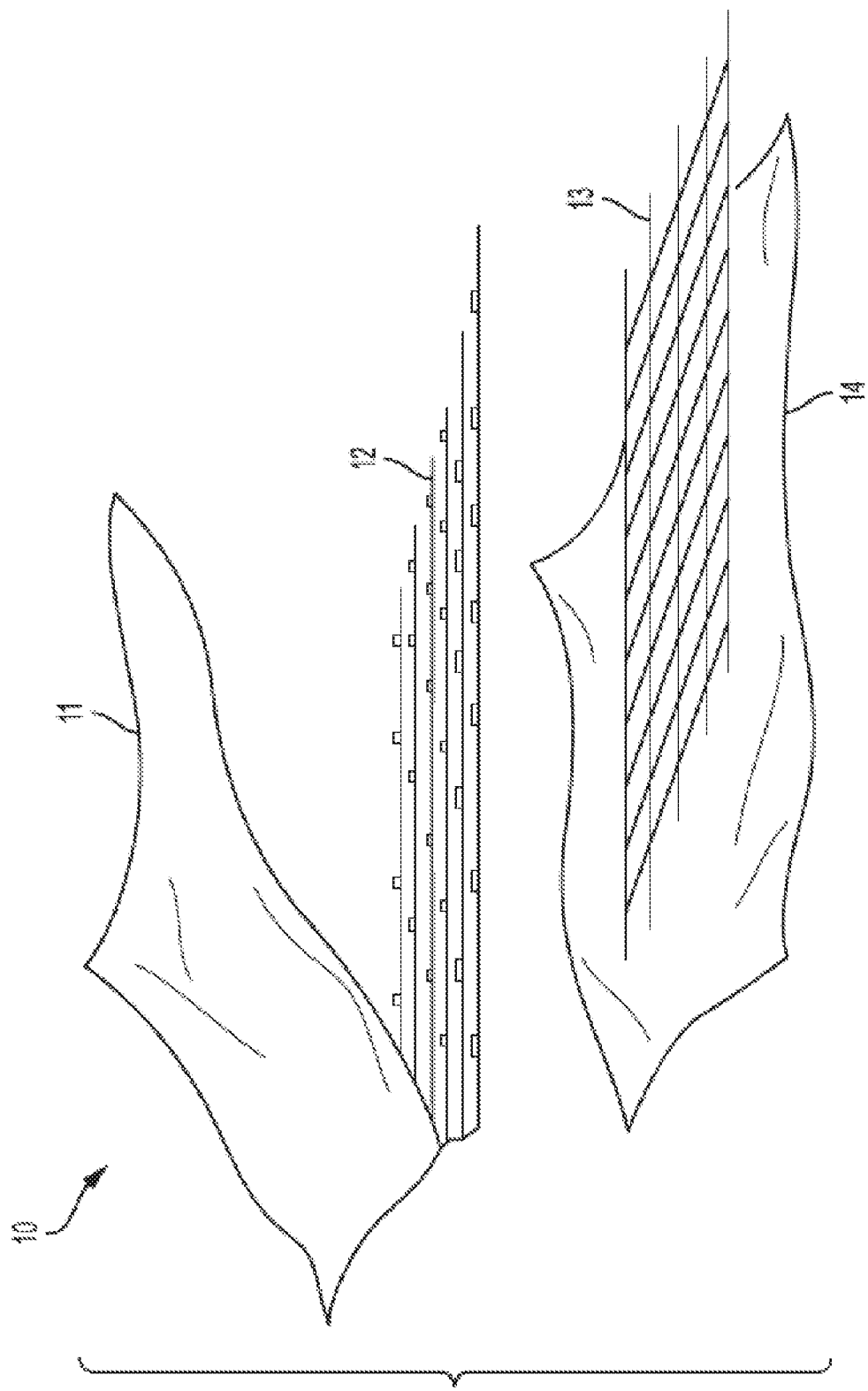
FIG. 12 shows an exploded view of a surface covering according to one embodiment.

FIG. 10 shows a schematic detail view of a portion of a growth habitat of an agricultural module 1000 according to one embodiment. The growth habitat of the agricultural module 1000 may comprise one or more stackable structures 1001 each having one or more base portions 1002 configured to support a growth medium (e.g., soil, a hydroponic support, and/or the like) one or more sidewalls and a ceiling. The stackable structures 1001 may be suspended from support frames of the growth habitat, may be stacked such that the support of an upper structure is supported by a lower structure, and/or the like. The one or more sidewalls and ceiling are configured to contain the controlled atmospheric conditions within the structure (e.g., environmental air having controlled oxygen and carbon dioxide levels, controlled temperature, controlled humidity, and/or the like). The one or more sidewalls and ceiling may comprise a covering material, such as a flexible covering material, a rigid covering material, and/or the like. In certain embodiments, the covering material may comprise integrated growth lamps (e.g., light emitting diode growth lamps) and/or integrated electrical circuitry and/or may be configured to enable natural sunlight to pass through the covering material to the contained environment. In certain embodiments, the integrated growth lamps may be spaced at regular intervals throughout the flexible covering material and may be electrically connected relative to one another and/or relative to one or more power sources via electrical circuitry. For example, in the illustrated embodiment of FIG. 10, the covering material comprises a solar canopy 100 as discussed herein, with integrated LEDs 12 spaced across the surface of the canopy 100.

In embodiments comprising flexible covering materials, the agricultural module may comprise one or more rigid supports collectively forming a rigid support frame for the flexible covering material.

In certain embodiments, the agricultural module 1000 may be embodied as a portable system that is configured to be quickly set up at a desired agricultural site. The agricultural module 1000 may additionally comprise one or more sensors 1003 that may be provided within the growth medium of the growth habitat. These sensors may be embodied as a portion of a flexible bundle of electrical circuitry, including conductors, sensors, and/or the like that may be quickly deployed within a growth habitat by unrolling the bundle onto a support surface of the growth habitat before providing the growth medium therein. In certain embodiments, the various sensors may be electrically connected relative to one another, relative to a control computing system 1004, and/or relative to a power source via one or more conductors (e.g., flexible conductors). The various sensors may comprise moisture sensors, temperature sensors, carbon dioxide content sensors, oxygen sensors, humidity sensors, and/or the like. It should be understood that certain of the described sensors may be configured for wireless data transmission to a control computing system via one or more wireless communication technologies, such as Wi-Fi, Bluetooth, Internet of Things (IoT) technologies, and/or the like.

In certain embodiments, sensor outputs (e.g., indicative of measured aspects of the environment within the growth habitat) may be utilized by the control computing system 1004 to regulate the environmental conditions within the growth habitat. For example, the control computing system 1004 may comprise data indicative of one or more target environmental conditions, such as a target temperature, target carbon dioxide content, and/or the like. Based on the monitored data output from the various sensors 1003 within the growth habitat, the control computing system 1004 is configured to compare the monitored data output against the target environmental conditions, and may be configured to adjust water flows, carbon dioxide flows, and/or the like from the AWG 100 into the growth habitat. For example, the control computing system 1004 may be configured to automatically activate sprinkler (or drip irrigation) systems (which may be incorporated into the stackable structures 1001) within the growth habitat to water the plants within the growth habitat in response to predetermined conditions; to increase and/or decrease the amount of carbon dioxide flowing into the growth habitat from carbon dioxide capture systems of the AWG system 100, and/or the like.

Moreover, the growth habitat may comprise one or more automated planting and harvesting mechanisms configured to autonomously plant seeds for new plants, and/or to automatically harvest fruits and/or vegetables grown within the growth habitat (this includes the use of agricultural robots and drones).

For example, seed planting/management may be provided via a planting probe 1010 operable to move along a grid/track system 1011 elevated above a support surface of the growth habitat. In certain embodiments, the grid/track system 1011 may be raised and/or lowered via a support mechanism (e.g., a pneumatic and/or hydraulic support mechanism). The planting probe 1010 may be operable in response to signals received from the control computing system 1004, which comprises data indicative of an internal mapping of the planting medium and/or base portions 1002 within the growth habitat. The control computing system 1004 additionally comprises data indicative of a desired crop, crop spacing, and/or the like for planting within the growth habitat and may provide movement signals to the planting probe 1010 to insert seeds into the planting medium according to a desired planting plan.

The planting probe 1010 itself may comprise a hopper 1012 configured to hold a volume of seed, and an insertion probe 1013 (e.g., a wedge-shaped insertion probe) configured to inject seed at an appropriate depth within the planting medium (as determined by the control computing system 1004). The planting probe 1010 additionally comprises a movement mechanism (e.g., one or more motors) configured to move the planting probe 1010 along the track/grid to plant seeds within the planting medium. Moreover, the planting probe 1010 may be configured to periodically return to a refill position within the growth habitat to retrieve additional seed within the included hopper 1012. The refill position may be positioned within the growth habitat, proximate a fill chute containing additional seed that may be selectively provided to the planting probe 1010 as needed. In certain embodiments, the fill chute may be embodied as a container supported (e.g., suspended) above the movement path of the planting probe, such that the planting probe 1010 may move below the fill chute to be refilled by gravitational force moving the seed from the fill chute into the planting probe 1010. Moreover, in certain embodiments the fill chute may comprise an actuatable feed door (e.g., a servo-actuated feed door) configured to open and allow a flow of seed out of the feed chute in response to a signal received from the control computing system 1004. Thus, when the planting probe 1010 is positioned beneath the feed chute, the control computing system 1004 may be configured to open the feed door to enable seed to flow from the feed chute to the planting probe 1010. Once an appropriate amount of seed has been provided to the planting probe 1010, the control computing system 1004 may transmit a second signal causing the feed door to close.

The planting probe 1010 may additionally comprise a harvesting mechanism that may be detachably secured relative to the movable planting probe 1010. The harvesting mechanism may comprise a mechanically movable cutting/picking arm 1014 and a holding basket/tray 1015. Once the planting probe 1010 receives signals from the control computing system 1004 to initiate the harvest process, the planting probe 1010 may process to pick and/or cut produce/plants from the various plants within the growth habitat, and to deposit the cut produce/plants into the holding basket/tray 1015. Once the holding basket/tray 1015 is full, the planting probe 1010 may return to a docking position, where the holding basket/tray 1015 may deposit the harvested items into a retention crate that may be removed from the growth habitat. Moreover, in certain embodiments the retention crate may comprise one or more level sensors configured to monitor the amount of harvested items within the retention crate to avoid the retention crate from overflowing. Upon detecting that the retention crate fill level is above a threshold level, the control computing system 1004 may be configured to transmit a signal to the planting probe 1010 to suspend harvesting operations until the retention crate is emptied.

Although described above in reference to a track-based planting and harvesting probe configuration, various embodiments may be configured to plant seeds and/or harvest produce via an unmanned aerial vehicle (UAV) comprising a planting probe and/or a harvesting probe having a configuration similar to that described above. The UAV may be autonomous and may be configured to navigate the interior of the growth habitat according to a defined planting plan. In certain embodiments, the planting plan may define a map of locations of intended seed plantings, such that the autonomous UAV may be configured to autonomously navigate between the plurality of intended seed planting locations to deposit seeds within the growth medium.

The autonomous UAV may additionally comprise a harvesting probe configuration similar to that described herein. The UAV with the harvesting probe configuration may be configured to autonomously navigate the interior of the growth habitat to harvest produce grown therein.

The irrigation system of the growth habitat may be embodied as one or more tubes that may be connected to water distribution mechanisms, such as spraying-style sprinklers, drip-irrigation tubes, and/or the like. The tubes may comprise a plastic, flexible tubing and may be embodied as a self-healing material configured to self-seal cracks, cuts, and/or punctures through the tube walls. These tubes may be connected to a water outlet of a condensation system of the AWG system, a water holding tank of the AWG system, and/or the like.

Moreover, the irrigation system may comprise a fertilizer supply mechanism configured to automatically mix a metered quantity of fertilizer (e.g., a liquid fertilizer) into water supplied to the irrigation system. The fertilizer supply mechanism may be in electronic communication with the control computing system 1004, which may be configured to provide signals to the fertilizer supply mechanism to modify the amount of liquid fertilizer introduced into the water stream.

Example Operation of an Atmospheric Air Generation System

The following discussion provides an example operation of the operation of an embodiment utilizing a membrane-based water extraction process as a part of an atmospheric water generation system and method. It should be noted that recitation of the term "about" with reference to a numerical value (e.g., a temperature value, a pressure value, and/or the like) encompasses both the value itself as well as deviations from the value that provide the same functional operation of the methodology in which the value is recited. For example, a recitation of a temperature range between "about" 10° F. to "about" 50° F. is intended to encompass a temperature range between 10° F. to 50° F., as well as slight deviations in the upper and lower bounds of the temperature range that provide the same functionality as the recited temperature range. Moreover, the concepts discussed herein may be utilized with any of a variety of desiccant fluids, gels, aerogels, and/or the like, as the described process is not dependent on the desiccant utilized. Any one of a plurality of desiccant fluids may be utilized, including the non-limiting examples of $CaCl_2$, NaCl, LiCl, KCOOH, $MgCl_2$, Ionic liquids, Deep Eutectic Solvent, Organic Liquids and/or any combination thereof.

As an example operation, a desiccant fluid exits the absorber at a concentration between about 10% and about 50% by weight percent, and a temperature between about 75° F. and about 130° F. The desiccant fluid flows along a flow path (using one or more pumps, as needed) through one or more heating mechanisms, such as a condenser (utilizing the relatively cool temperature of the dilute desiccant on a first side of the condenser to condense water vapor flowing within a water flow path as discussed in greater detail herein, wherein the water flow path flows on an opposite side of the heat exchanger embodied as the condenser). Water vapor condenses in the condenser as it traverses through the condenser as it warms the dilute desiccant fluid. In another embodiment, the condenser is a double pipe heat exchanger where the dilute desiccant fluid enters the double pipe heat exchanger through the inner pipe. Water vapor enters the heat exchanger via the outer pipe. Water vapor condenses on the exterior surface of the inner pipe as it traverses through the condenser.

In certain embodiments, the flow pattern through the condenser is in a counter current orientation with the dilute desiccant solution flowing in a first direction and the water flow path flowing in an opposite second direction through the heat exchanger (as mentioned, the dilute desiccant fluid is physically separated from the water flow path within the condenser). In other embodiments flow patterns through the condenser are in the co-current orientation depending on the shape and orientation of the heat exchanger embodying the condenser.

Upon exiting the condenser, the dilute desiccant fluid temperature is between about 132° F. and about 170° F. The dilute desiccant fluid is then sent to a second heat exchanger 629 where sensible heat transfer from rich desiccant fluid exiting the membrane-based water extraction device further heats the dilute desiccant fluid. In certain embodiments the second heat exchanger is a shell-and-tube heat exchanger with the dilute desiccant fluid entering on the tube side of the second heat exchanger. Rich desiccant fluid enters the shell side of the second heat exchanger. In another embodiment, the dilute desiccant fluid enters the shell side of the second heat exchanger, and the rich desiccant fluid enters the tube side of the second heat exchanger. In another embodiment the second heat exchanger is a plate and frame heat exchanger. Dilute desiccant fluid enters one set of plates while rich desiccant fluid enters the other set of plates. In another embodiment the second heat exchanger is a double pipe heat exchanger where the dilute desiccant fluid enters the double pipe heat exchanger via the inner pipe and rich desiccant fluid enters the heat exchanger via the outer pipe.

The dilute desiccant fluid exits the second heat exchanger at a temperature of between about 140° F. and about 210° F. The dilute desiccant fluid then traverses through a heater. The heater may be an inline electric heater with element bundles for heating the fluid. The heater may have different orientations to reduce the likelihood of fluid flashing on the elements. In certain embodiments, the heater may reside in the membrane-based water extraction device housing. In certain embodiments the heater is a heat exchanger of the shell-and-tube or plate-and-frame type. In certain embodiments the heater is a solar heater utilizing photovoltaic panels to generate energy through electricity from solar capture. In certain embodiments, the heater is a frenal lens utilizing solar energy to generate thermal energy in the form of heat. In certain embodiments the heater is a geothermal heater as discussed herein. In certain embodiments the heater is a fired heater utilizing a hydrocarbon fuel source combined with oxygen to create heat from combustion. In certain embodiments, the oxygen is used from the ambient air. Upon exiting the heater, the dilute desiccant fluid is at a temperature of between about 150° F. and about 270° F.

The dilute desiccant fluid then flows into to membrane-based water extraction device. In certain embodiments, a reducing orifice is provided at the exit of the membrane-based water extraction device to increase the pressure on the desiccant side of the membrane within the housing of the membrane-based water extraction device.

The dilute desiccant flow flows into the housing of the membrane-based water extraction device, on a first side of the membrane. The dilute desiccant flow is at a high temperature (e.g., between about 150° F. and about 270° F.) and a high pressure. A water flow passes on an opposite, second side of the membrane as it flows along a water flow path. The water flow path may pass through a reducing orifice at the entry to the membrane-based water extraction device to reduce the pressure on the water flow side of the membrane to encourage water to pass through the membrane to the water flow side of the membrane. Moreover, the water flow passes through a chiller prior to entry into the housing of the membrane-based water extraction device.

As the diluted desiccant and the water flow through the housing of the membrane-based water extraction device on opposite sides of the membrane, water absorbed within the fluid desiccant migrates through the membrane (it is believed that the water enters the membrane on the desiccant side of the membrane as a liquid and exits the membrane on the water side of the membrane as a vapor). This reconcentrates the desiccant fluid, while capturing water vapor within the permeate water flow path for later condensation and storage for use as liquid water. The reconcentrated desiccant fluid them flows back to the absorber (e.g., passing through one or more heat exchangers for sensible heat transfer to the dilute desiccant solution as discussed above) by passing through one or more chiller devices to cool the temperature of the desiccant fluid prior to entry into the absorber. The entire flow path of the desiccant is a closed desiccant circulation loop configured for negligible mass transfer of desiccant salt through the membrane of the membrane-based water extraction device and/or into atmospheric air contacting the desiccant flow within the absorber. As the desiccant flows along the flow paths within the closed desiccant circulation loop, water is absorbed into the desiccant and/or extracted from the desiccant as the desiccant flows through the AWG system.

The water flow path exiting the membrane-based water extraction device passes out of the membrane-based water extraction device and passes through one or more condensers. In certain embodiments, a sweep gas (e.g., a gas having characteristics to lower the possibility of water evaporation into the gas and/or a high-humidity air flowing along a closed-air circulation loop coextensive with the water flow path) flows with the liquid water so as to flow the water vapor out of the membrane-based water extraction device and to the condensers. In certain embodiments, the water flow passes through a compressor to increase the pressure of the water flow (thereby increasing the vapor pressure of the water vapor to encourage condensation) prior to passing the water flow through the one or more condensers. After the water flow path passes through the condenser, the water flow path passes into a storage tank. Certain amounts of water from the storage tank recirculate through the water flow path (to the membrane-based water extraction device) to encourage extraction of additional water from dilute desiccant fluid flowing through the membrane-based water extraction device.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

In certain embodiments, various portions of the AWG system may be enclosed within one or more shipping containers that may be easily transported as modular system components to desired operating locations. For example, the air preconditioning system may be enclosed within a first container, and one or more water consolidation systems (e.g., a single-stage batch water consolidation system and/or a continuous water consolidation system) may be enclosed within a second shipping container, with various ports/inlets extending through walls of the shipping containers to enable connection with one or more geothermal cooling systems, solar heating systems, high-pressure gas inputs, and/or the like. In certain embodiments, one or more condensation systems, water storage tanks, and/or the like may be embodied within a third storage container. However, it should be understood that certain embodiments may be configured such that the entirety of the AWG system may be enclosed within a single storage container, with one or more ports/inlets extending through walls thereof to enable interaction with aspects of the surrounding environment (e.g., air inlets/exhausts, high pressure gas inlets, solar heating inlets/outlets, geothermal cooling inlets/outlets, and/or the like).

What is claimed is:

1. A method of water extraction comprising separating water from a hygroscopic feed solution, the method comprising:
    absorbing water into a hygroscopic feed solution in an atmospheric water collection component;
    flowing the hygroscopic feed solution into a retention chamber of an excitation component from the atmospheric water collection component and through an inlet of the excitation component;
    exciting the hygroscopic feed solution in the retention chamber of the excitation component using ultrasonic waves in order to heat the hygroscopic feed solution; and
    flowing the heated hygroscopic feed solution out of the excitation component through an outlet of the excitation component and into a water separation system where water vapor is separated from the heated hygroscopic feed solution.

2. The method of claim 1, wherein the method is selected from a batch process or a continuous process.

3. The method of claim 2, wherein the hygroscopic feed solution resides in the retention chamber for at least 30 minutes.

4. The method of claim 1, wherein the ultrasonic waves are tuned such that sensible heating is achieved based on a composition of the hygroscopic feed solution.

5. The method of claim 4, wherein the tuning of ultrasonic waves comprises changing a frequency of the ultrasonic waves.

6. The method of claim 1, wherein the ultrasonic waves are high power or low-frequency waves comprising ultrasonic waves at frequencies between 20 kHz to 100 kHz.

7. The method of claim 1, wherein the ultrasonic waves are medium power or intermediate-frequency waves comprising ultrasonic waves at frequencies between 100 kHz to 1 MHz.

8. The method of claim 1, wherein the ultrasonic waves are low power or high-frequency waves comprising ultrasonic waves at frequencies between 1 MHz to 10 MHz.

9. The method of claim 1, wherein the ultrasonic waves generate local temperatures of at least 500K.

* * * * *